United States Patent
Matsumoto

(10) Patent No.: US 11,035,932 B2
(45) Date of Patent: Jun. 15, 2021

(54) RADAR DEVICE AND TRANSMISSION PROCESSING METHOD OF RADAR DEVICE

(71) Applicant: DENSO TEN Limited, Kobe (JP)

(72) Inventor: Toshihiro Matsumoto, Kobe (JP)

(73) Assignee: DENSO TEN Limited, Kobe (JP)

( * ) Notice: Subject to any disclaimer, the term of this patent is extended or adjusted under 35 U.S.C. 154(b) by 196 days.

(21) Appl. No.: 16/111,758

(22) Filed: Aug. 24, 2018

(65) Prior Publication Data

US 2019/0113602 A1  Apr. 18, 2019

(30) Foreign Application Priority Data

Oct. 16, 2017  (JP) .............................. JP2017-200401

(51) Int. Cl.
| | |
|---|---|
| G01S 7/42 | (2006.01) |
| G01S 13/34 | (2006.01) |
| G01S 7/03 | (2006.01) |
| G01S 13/58 | (2006.01) |
| G01S 13/931 | (2020.01) |
| G01S 7/35 | (2006.01) |
| G01S 13/00 | (2006.01) |

(52) U.S. Cl.
CPC ................ *G01S 7/42* (2013.01); *G01S 7/032* (2013.01); *G01S 13/343* (2013.01); *G01S 13/584* (2013.01); *G01S 13/931* (2013.01); *G01S 2007/356* (2013.01)

(58) Field of Classification Search
None
See application file for complete search history.

(56) References Cited

U.S. PATENT DOCUMENTS 4,611,211 A * 9/1986 Leitl ....................... G01S 13/87
                                                     342/107
5,008,678 A * 4/1991 Herman ................ G01S 13/931
                                                     342/158

(Continued)

FOREIGN PATENT DOCUMENTS

JP          2016-003873 A     1/2016
WO    WO2014/068844 A1  *  5/2014  ............. B60K 28/06

OTHER PUBLICATIONS

English-language abstract of foreign patent publication JP2016003873A. (Year: 2016).*

Primary Examiner — Bernarr E Gregory
(74) Attorney, Agent, or Firm — Oliff PLC

(57) ABSTRACT

A radar device includes a signal generating unit that generates a transmission signal; an output unit that outputs a transmission wave based on the transmission signal, at each of predetermined angles; a receiving unit that receives the reflected waves of the transmission wave from targets; and a deriving unit that derives information on the targets on the basis of reception signals related to the reflected waves. The signal generating unit generates a first transmission signal including at least one modulated signal as the transmission signal related to the transmission wave to be output at a first angle, several times, at intervals of a predetermined idle running time, and generates a second transmission signal including at least one modulated signal, as the transmission signal related to the transmission wave to be output at each of second angles different from the first angle, in each interval of the idle running time.

10 Claims, 12 Drawing Sheets

(56) References Cited

U.S. PATENT DOCUMENTS

| | | | | |
|---|---|---|---|---|
| 5,045,856 | A * | 9/1991 | Paoletti | G01S 13/931 340/904 |
| 5,229,774 | A * | 7/1993 | Komatsu | G01S 13/34 342/128 |
| 5,598,163 | A * | 1/1997 | Cornic | G01S 13/931 342/70 |
| 6,085,151 | A * | 7/2000 | Farmer et al. | G01S 13/931 701/301 |
| 6,184,819 | B1 * | 2/2001 | Adomat | G01S 13/48 342/107 |
| 6,246,359 | B1 * | 6/2001 | Asano | G01S 13/34 342/158 |
| 6,380,884 | B1 * | 4/2002 | Satou | G01S 13/48 342/70 |
| 6,518,916 | B1 * | 2/2003 | Ashihara | G01S 13/931 342/70 |
| 6,628,227 | B1 * | 9/2003 | Rao | G01S 13/931 342/70 |
| 6,762,711 | B1 * | 7/2004 | Doerfler | G01S 13/931 342/70 |
| 8,717,224 | B2 * | 5/2014 | Jeong | G01S 13/931 342/70 |
| 8,941,533 | B2 * | 1/2015 | Mizutani | G01S 13/48 342/147 |
| 9,435,883 | B2 * | 9/2016 | Moriuchi | G01S 13/931 |
| 9,500,745 | B2 * | 11/2016 | Binzer | G01S 13/931 |
| 9,810,768 | B2 * | 11/2017 | Gross | G01S 13/34 |
| 10,126,409 | B2 * | 11/2018 | Loesch | G01S 13/42 |
| 10,605,911 | B1 * | 3/2020 | Parker | G01S 13/931 |
| 2004/0085197 | A1 * | 5/2004 | Watanabe | G08G 1/166 340/435 |
| 2008/0169969 | A1 * | 7/2008 | Shirai | G01S 7/4972 342/107 |
| 2010/0127916 | A1 * | 5/2010 | Sakai | G01S 13/89 342/135 |
| 2010/0253574 | A1 * | 10/2010 | Mizutani | G01S 13/424 342/26 R |
| 2012/0127024 | A1 * | 5/2012 | Takashima | H01Q 3/30 342/146 |
| 2012/0268314 | A1 * | 10/2012 | Kuwahara | G01S 13/42 342/147 |
| 2013/0229297 | A1 * | 9/2013 | Mukai | G01S 13/0209 342/92 |
| 2015/0204971 | A1 * | 7/2015 | Yoshimura | G01S 13/931 342/70 |

* cited by examiner

RADAR DEVICE AND TRANSMISSION PROCESSING METHOD OF RADAR DEVICE

CROSS-REFERENCE TO RELATED APPLICATIONS

This application is based on and claims priority under 35 USC119 from Japanese Patent Application No. 2017-200401 filed on Oct. 16, 2017.

BACKGROUND

The present disclosure relates to a radar device and a transmission processing method of the radar device.

In the related art, FCM (Fast Chirp Modulation) type radar devices are known (see Patent Literature 1 for instance). An FCM type radar device uses chirp waves in which the frequency continuously increases or decreases, as radar waves, and measures distances and relative velocities by generating beat signals from transmission and reception signals and performing two-dimensional FFT (Fast Fourier Transform) on the beat signals.

[Patent Literature 1] Japanese Patent Application Laid-Open No. 2016-3873

An FCM system needs to transmit a plurality of chirp waves (modulated waves). For this reason, when it is tried to achieve equivalent capabilities in terms of individual velocity information items (for example, velocity resolution and maximum detectable velocity), it is likely that the time for beam transmission will be longer than the time for FMCW (Frequency Modulated Continuous Wave) transmission.

Also, in the case where beams which are transmitted from a radar device have a narrow width, in order to widen the detection range, the radar device needs to perform beam transmission a plurality of times while changing the beam transmission angle. As a result, the beam transmission time is likely to lengthen. In the case where the beam width is widened, the frequency at which the angle should be changed decreases and the beam transmission time shortens. However, in this case, the angular resolution decreases.

SUMMARY

It is therefore an object of the present disclosure to provide a technology capable of reducing the beam transmission time required to acquire target information while suppressing angle measurement capability from declining.

According to an aspect of the present disclosure, there is provided a radar device including: a signal generating unit configured to generate a transmission signal; an output unit configured to output a transmission wave based on the transmission signal, at each of predetermined angles; a receiving unit configured to receive the reflected waves of the transmission wave from targets; and a deriving unit configured to derive information on the targets on the basis of reception signals related to the reflected waves. The signal generating unit generates a first transmission signal including at least one modulated signal as the transmission signal related to the transmission wave to be output at a first angle, a plurality of times, at intervals of a predetermined idle running time, and generates a second transmission signal including at least one modulated signal, as the transmission signal related to the transmission wave to be output at each of second angles different from the first angle, in each interval of the idle running time.

In the radar device, the signal generating unit may generate a third transmission signal in which a plurality of modulated signals continues, as the transmission signal related to the transmission wave to be output at the first angle, in a time period different from a time period when the signal generating unit generates the plurality of first transmission signals.

In the radar device, the signal generating unit may generate a fourth transmission signal including at least one modulated signal, as the transmission signal related to the transmission wave to be output at the first angle, a plurality of times, at intervals of an idle running time different from the predetermined idle running time, and the plurality of fourth transmission signals may be generated in a time period different from a time period when the signal generating unit generates the plurality of first transmission signals.

In the radar device, the deriving unit may derive relative velocities of targets on the basis of the reception signals obtained by transmission of the transmission wave based on the plurality of first transmission signals.

In the radar device, the deriving unit may combine relative velocities derived on the basis of the reception signals obtained by transmitting the transmission wave based on the plurality of first transmission signals and the transmission wave based on the third transmission signals, thereby determining relative velocities of targets.

In the radar device, the deriving unit may combine relative velocities derived on the basis of the reception signals obtained by transmitting the transmission wave based on the plurality of first transmission signals and the transmission wave based on the plurality of fourth transmission signals, thereby determining relative velocities of targets.

In the radar device, the second angles may include all angles of the predetermined angles, except for the first angle, and the signal generating unit may sequentially generate the second transmission signals corresponding to all individual angles except for the first angle, in each interval of the idle running time.

According to an aspect of the present disclosure, there is provided a transmission processing method of a radar device, including: a signal generating process of generating a transmission signal; and an output unit process of outputting a transmission wave based on the transmission signal, at each of predetermined angles. The signal generating process includes: a process of generating a first transmission signal including at least one modulated signal as the transmission signal related to the transmission wave to be output at a first angle, a plurality of times, at intervals of a predetermined idle running time; and a process of generating a second transmission signal including at least one modulated signal, as the transmission signal related to the transmission wave to be output at each of second angles different from the first angle, in each interval of the idle running time.

According to an aspect of the embodiment of the present invention, it is possible to reduce the beat transmission time for acquiring target information while suppressing angle measurement capability from declining.

BRIEF DESCRIPTION OF THE DRAWINGS

Exemplary embodiments of the present invention will be described in detail based on the following figures, wherein.

DETAILED DESCRIPTION

Hereinafter, illustrative embodiments of the present invention will be described in detail with reference to the drawings.

First Embodiment

1-1. Configuration of Radar Device

Figure 1:
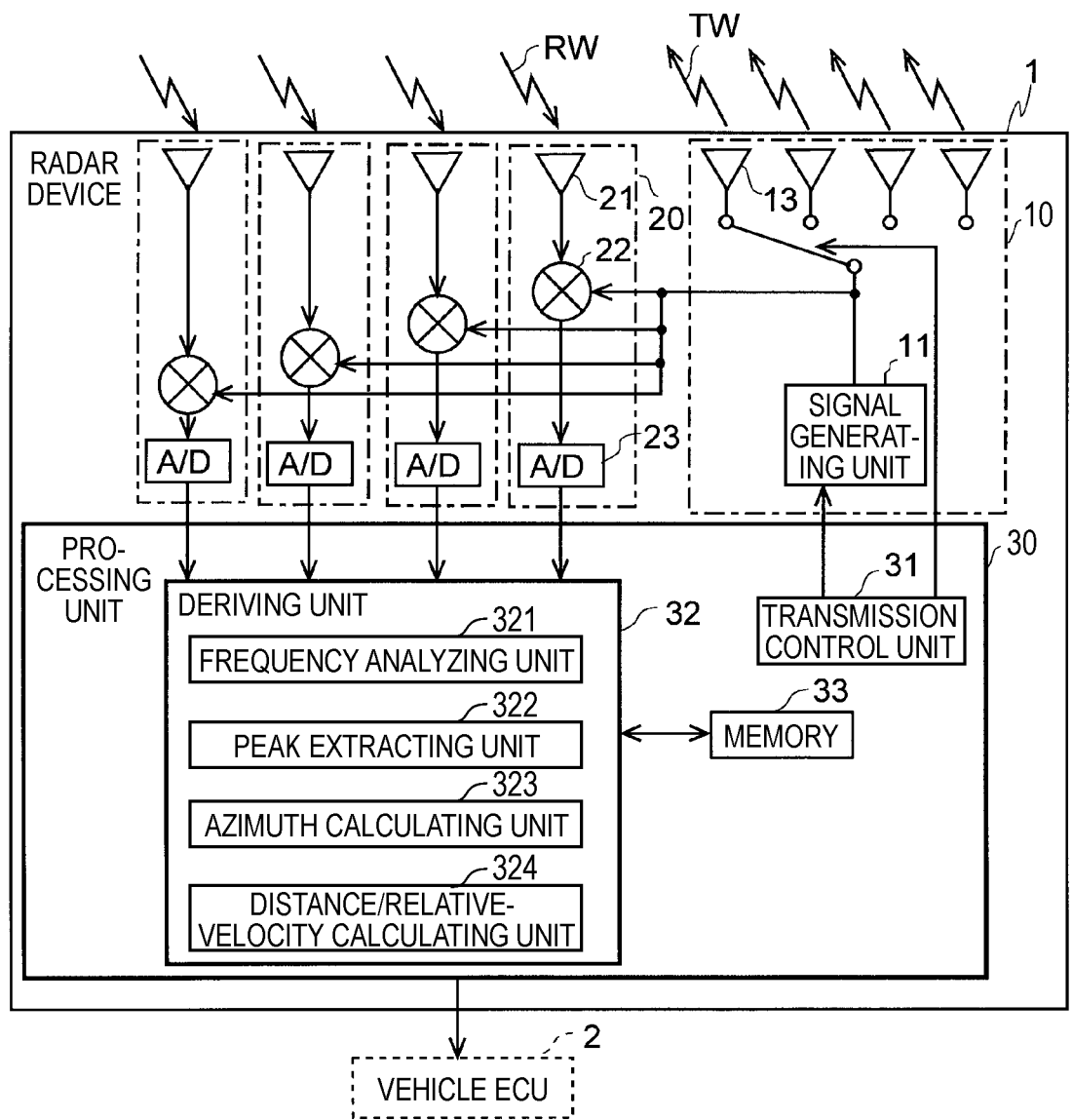
FIG. 1 is a view illustrating the configuration of a radar device according to a first embodiment.

FIG. 1 is a view illustrating the configuration of a radar device 1 according to a first embodiment. The radar device 1 of the present embodiment is mounted on a vehicle. The radar device 1 is used to detect targets existing around the vehicle, such as other vehicles, signs, guardrails, people, and so on. Target detection results are output to a memory device of the vehicle, a vehicle ECU (Electrical Control Unit) 2 for controlling behavior of the vehicle, and so on, and are used, for example, in a PCS (Pre-crash Safety System), an AEBS (Advanced Emergency Braking System), and so on for vehicle control. The radar device 1 according to the present embodiment can be used as an on-vehicle radar device, and can also be used in various other applications. For example, the radar device 1 according to the present embodiment may be used in monitoring of aircrafts in the sky and vessels at sea, and so on.

As shown in FIG. 1, the radar device 1 includes a transmitting unit 10, receiving units 20, and a processing unit 30. The processing unit 30 is connected to the above-mentioned vehicle ECU 2. The processing unit 30 outputs information to the vehicle ECU 2.

The transmitting unit 10 includes a signal generating unit 11 including an oscillator (not shown in the drawings), and an output unit 13. In other words, the radar device 1 includes the signal generating unit 11 and the output unit 13. The signal generating unit 11 generates a transmission signal. Specifically, under the control of a transmission control unit 31, the signal generating unit 11 generates a modulated signal for transmitting a millimeter wave, and generates a transmission signal on the basis of the modulated signal by the oscillator. The signal generating unit 11 outputs the generated transmission signal to transmission antennae 13. Also, the transmission signal generated by the signal generating unit 11 is distributed to mixers 22 to be described below.

Figure 2:
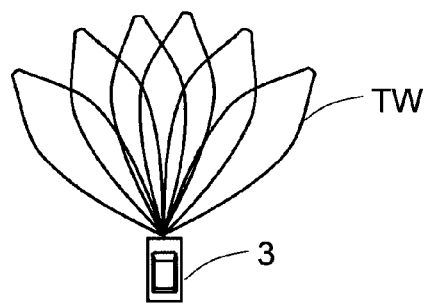
FIG. 2 is a view schematically illustrating a transmission wave which is transmitted from transmission antennae.

The output unit 13 outputs a transmission wave at each of predetermined angles on the basis of the transmission signal. Specifically, the output unit 13 is composed of transmission antennae. Each transmission antenna 13 converts the signal received from the signal generating unit 11 into a transmission wave TW, and transmits the transmission wave TW to the outside of a vehicle 3 (see FIG. 2). FIG. 2 is a view schematically illustrating the transmission wave TW (a beam) which is transmitted from the transmission antennae 13. As shown in FIG. 2, the transmission antennae 13 transmit the transmission wave TW to a plurality of azimuth directions in a horizontal direction. The plurality of azimuth directions is set in advance. In other words, the transmitting unit 10 transmits the transmission wave TW at each of predetermined angles. The number of transmission antennae 13 needs only to be one or more. The transmission wave TW transmitted from the transmission antenna 13 to the outside of the vehicle 3 (for example, forward from the vehicle) is reflected from targets such as other vehicles and so on, thereby becoming reflected waves.

In the present embodiment, transmission of the transmission wave TW to the plurality of directions is performed by an electronic scan system. The electronic scan system may be, for example, a phased array system or a beam switch system. The example shown in FIG. 1 is the beam switch system. In the phased array system, for example, a transmission antenna 13 is configured by arranging a plurality of element antennae. The transmission antenna performs scanning with a transmission wave TW (a beam) under the signal phase control of phase shifters connected to the element antennae. In the beam switch system, a plurality of antennae for transmitting a narrows beam is fixed so as to point in different directions, and the antennae transmit the transmission wave TW in turn in an electrical time-division manner, thereby performing scanning with the transmission wave TW (a beam). Alternatively, transmission of the transmission wave TW to the plurality of directions may be performed in a mechanical scanning manner. In this case, the number of transmission antennae may be one.

The receiving units 20 receive the reflected waves of the transmission wave TW from targets. The receiving units 20 include receiving antennas 21, the mixers 22, and A/D converters 23. The receiving antennae 21 receive the reflected waves from targets, as reception waves RW, and convert the reception waves RW into reception signals, and outputs the reception signals to the mixers 22. The number of receiving antennae 21 needs only to be one or more. However, in the example shown in FIG. 1, the number of receiving units 20 is two or more, and thus the number of receiving antennae 21 also is two or more. The receiving antennae 21 may be, for example, a plurality of antennae constituting an array antenna. In the case where the number of receiving antennae 21 is two or more, the number of mixers 22 and the number of A/D converters 23 also may be set to two or more according to the number of receiving antennae.

Each mixer 22 mixes the transmission signal distributed from the transmitting unit 10 and some reception signals input from a corresponding receiving antenna 21, thereby generating beat signals without unnecessary signal components. The mixers 22 output the generated beat signals to the A/D converters 23. The beat signals are the differential waves between the transmission wave TW and the reception waves RW, and have beat frequencies which are the differences between the frequency of the transmission signal (hereinafter, referred to as the transmission frequency) and the frequencies of the reception signals (hereinafter, referred to as the reception frequencies). The A/D converters 23 convert the beat signals into digital signals, and outputs the digital signals to the processing unit 30.

The processing unit 30 includes the transmission control unit 31, a deriving unit 32, and a memory 33. In other words, the radar device 1 includes the deriving unit 32. The processing unit 30 is configured with a microcomputer including a CPU (Central Processing Unit), the memory 33 including a ROM (Read Only Memory) and a RAM (Random Access Memory), registers, input/output ports, and so on. The CPU executes a program stored in the ROM, whereby the processing unit 30 serves as the transmission control unit 31 and the deriving unit 32. The transmission control unit 31 controls the transmitting unit 10 including the signal generating unit 11. The deriving unit 32 derives information on targets on the basis of reception signals related to reflected waves. The deriving unit 32 has a frequency analyzing unit 321, a peak extracting unit 322, an azimuth calculating unit 323, and a distance/relative-velocity calculating unit 324, as main functions units.

However, any one or both of the transmission control unit 31 and the deriving unit 32 may be configured with hardware such as an ASIC (Application Specific Integrated Circuit), an FPGA (Field Programmable Gate Array), and the like. Also, the individual functional units are conceptual components, and the function of one component may be dispersed to a plurality of components, and the functions of a plurality of components may be integrated in one component.

In the present embodiment, the radar device 1 uses an FCM system. The FCM system is a system for generating a transmission signal for generating a chirp wave (a modulated wave) in which the frequency continuously increases or decreases, and receiving the reflected waves of the chirp wave from targets, as reception signals, and generating beat signals from the transmission signal and the reception signals, and detecting the distances and relative velocities of the targets from the frequencies of the beat signals and the phase differences between the beat signals.

Figure 3:
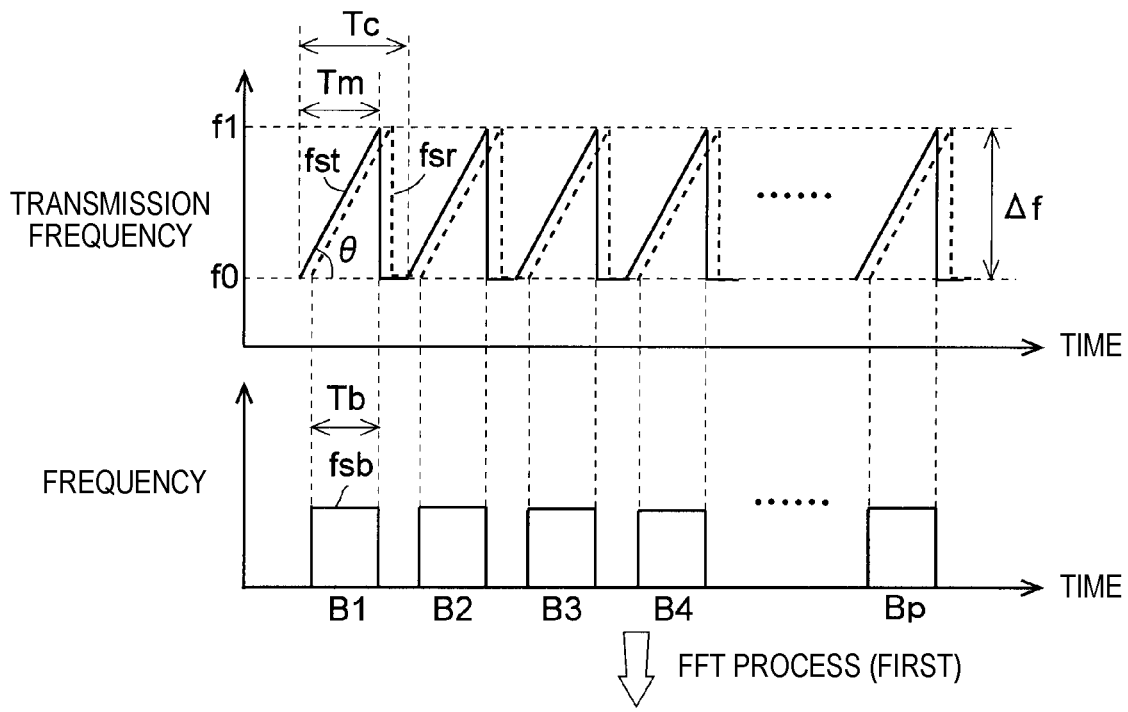
FIG. 3 is a schematic diagram for explaining an outline of an FCM system.
Figure 3:
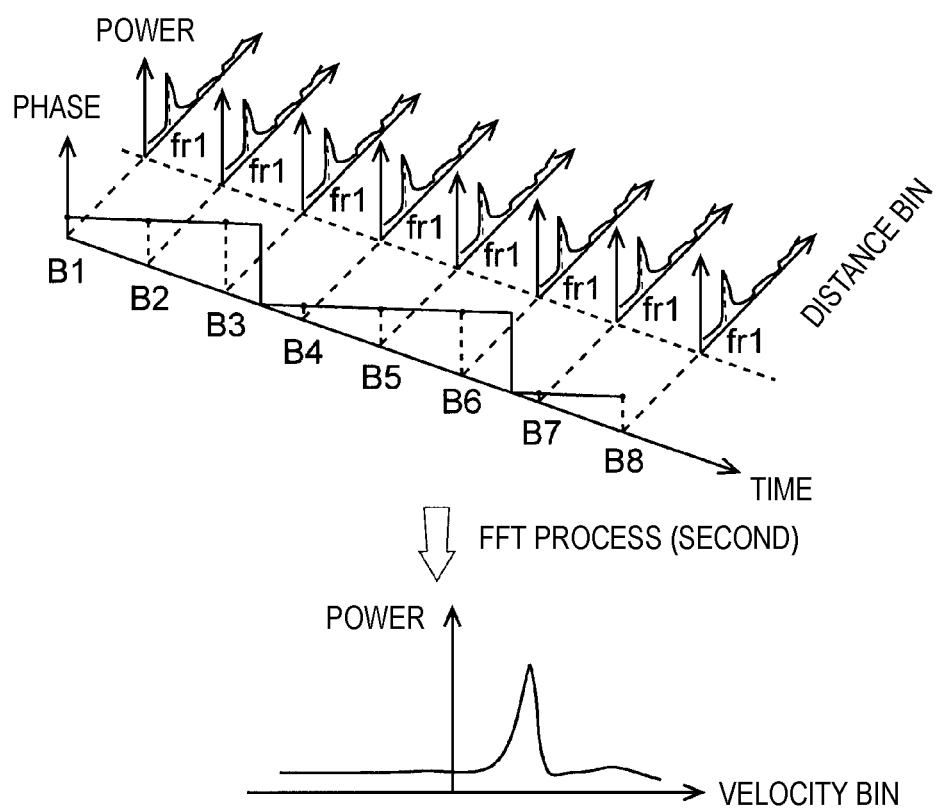

FIG. 3 is a schematic diagram for explaining an output line of the FCM system. In the FCM system, the signal generating unit 11 generates a modulated signal in which the voltage varies in a sawtooth waveform. Also, the signal generating unit 11 generates a chirp signal in which the frequency increases with time, in a predetermined cycle Tc (hereinafter, referred to as a chirp cycle Tc), on the basis of the modulated signal, and outputs the chirp signal to the transmission antennae 13. Each transmission antenna 13 converts the transmission signal received from the signal generating unit 11, into the transmission wave TW, and outputs the transmission wave TW to the outside of the vehicle 3. The transmission wave TW which is output from each transmission antenna 13 has the chirp cycle Tc and is composed of chirp waves in which the frequency increases with time (see the upper part of FIG. 3). A plurality of chirp waves which is transmitted from the transmission antennae 13 makes it possible to calculate the distances and relative velocities of targets.

Also, in the example shown in the upper part of FIG. 3, the transmission wave has a sawtooth waveform. Specifically, in each chirp wave (one waveform), the transmission frequency fst increases from a reference frequency f0 to a maximum frequency f1 at a gradient θ with time, and then quickly returns to the reference frequency f0. The modulation width $\Delta f$ of a chirp wave can be expressed as $\Delta f = f1 - f0$. The gradient θ can be expressed as $\theta = \Delta f / Tm$ using the modulation width $\Delta f$ and the modulation time Tm. The modulation time Tm is a time when frequency modulation is performed on the chirp wave (one waveform). However, in each chirp wave, the transmission frequency fst may have a sawtooth waveform in which the transmission frequency quickly increases from the reference frequency f0 to the maximum frequency f1, and then decreases from the maximum frequency f1 to the reference frequency f0 at the gradient θ ($=\Delta f / Tm$) with time. In this case, in each chirp signal which is generated by the signal generating unit 11, the frequency decreases with time.

The receiving antennae 21 receive the reflected waves from targets, as reception waves RW, and outputs reception signals to the mixers 22. The mixers 22 each mix the transmission signal and some of the reception signals, thereby generating beat signals. As shown in the upper part of FIG. 3, with respect to each chirp wave, a beat signal having the difference between the transmission frequency fst and a reception frequency fsr as its beat frequency fsb ($=$fst$-$fsr) is generated. In FIG. 3, a beat signal which is obtained by a first chirp wave is denoted by "B1", and a beat signal which is obtained by a second chirp wave is denoted by "B2", and a beat signal which is obtained by a p-th chirp wave is denoted by "Bp". The A/D converters 23 convert the beat signals into digital signals, and outputs the digital signals to the processing unit 30. In the FCM system, in order to use chirp waves having a period shorter than the periods of chirp waves for FMCW systems, the A/D converters 23 faster than those for FMCW systems are used.

In the FCM system, the frequency analyzing unit 321 performs a first FFT process on each beat signal generated as described above. The result of the first FFT process is the frequency spectrum of the corresponding beat signal. In FFT, the reception levels and phase information at individual frequency bins set at frequency intervals according to frequency resolution are extracted. In other words, the results of the first FFT process are the power values (signal levels) at the individual frequency bins. The frequency bins in the results of the first FFT process correspond to the distances of the targets, and thus hereinafter will also be referred to as "distance bins". By specifying distance bins having peaks, it is possible to detect the distances of the targets. Hereinafter, the first FFT process will also be expressed as the distance direction FFT process.

In the case where the relative velocity between a target and the radar device 1 is zero, reception signals do not have any Doppler components, and reception signals corresponding to individual chirp waves have the same phase. Therefore, individual beat signals also have the same phase. Meanwhile, in the case where the relative velocity between a target and the radar device 1 is not zero, reception signals have Doppler components, and reception signals corresponding to individual chirp waves have different phases.

For this reason, temporally consecutive beat signals have a phase difference according to the Doppler frequency. The peak information obtained by the first FFT process includes the above-mentioned phase information.

The middle part of FIG. 3 shows an example of the results of the first FFT process on temporally consecutive beat signals (B1 to B8) and the peak phase differences between the beat signals. This example shows that peaks exist at a distance bin fr1 and the peaks have phase differences.

As described above, in the case where the relative velocity between a target and the radar device 1 is not zero, between peaks of beat signals corresponding to the same target, a phase difference according to the Doppler frequency appears. Therefore, if the frequency spectra obtained by performing the first FFT process on the individual beat signals are arranged in chronological order, and a second FFT process is performed, frequency spectra having peaks at frequency bins (hereinafter, referred to as velocity bins) corresponding to Doppler frequencies are obtained (see the lower part of FIG. 3). The corresponding frequency spectra are obtained with respect to the distance bins obtained as the results of the first FFT process, respectively. By specifying velocity bins at which peaks exist, it is possible to detect the relative velocities of targets. The second FFT process also is performed by the frequency analyzing unit 321. Hereinafter, the second FFT process will also referred to as the velocity direction FFT.

Also, although not shown in the drawings, a two-dimensional power spectrum having a distance bin axis and a velocity bin axis is obtained by the second FFT process. Combinations of distance bins and velocity bins having peaks representing power values equal to or larger than a predetermined value are specified as combinations of distance bins and velocity bins at which peaks exist. This process is performed by the peak extracting unit 322. Subsequently, on the basis of the combinations of distance bins and velocity bins specified as combinations at which peaks exist, the distances and relative velocities of targets are derived. The derivation of the distances and relative velocities is performed by the distance/relative-velocity calculating unit 324.

1-2. Details of Transmission Processing

In the present embodiment, the transmitting unit 10 transmits the transmission wave TW having a narrow beam width to the plurality of azimuth directions in the horizontal direction (see FIG. 2). By transmitting the narrow beam to the plurality of directions, it is possible to improve the angular resolution capability of the radar device 1. Also, by transmitting the narrow beam to the plurality of directions, it is possible to make the maximum transmission distance of the transmission wave in each direction longer than that in the case of outputting a wide beam.

Figure 4:
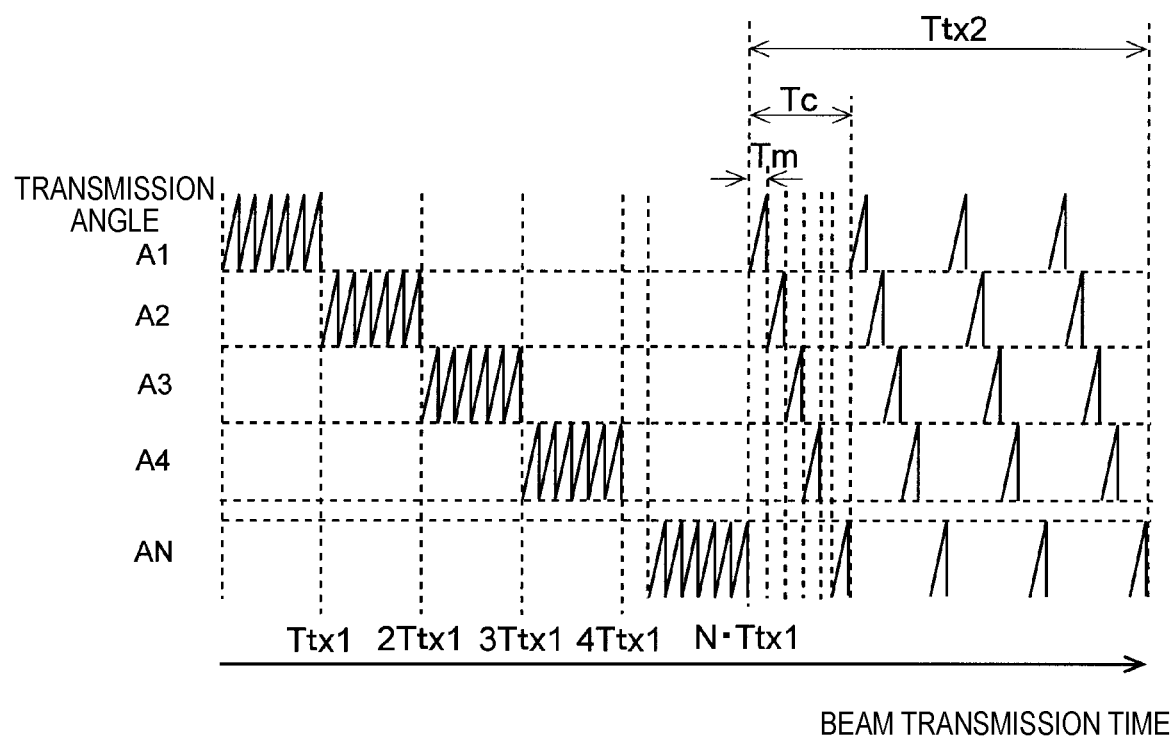
FIG. 4 is a schematic diagram for explaining transmission processing which is performed by the radar device of the first embodiment.

FIG. 4 is a schematic diagram for explaining transmission processing which is performed by the radar device 1 of the first embodiment. In FIG. 4, a transmission angle A1 to a transmission angle AN are the scanning directions of the transmission wave TW (a beam) which is transmitted from the transmission antennae 13. In other words, the radar device 1 transmits the transmission wave TW to N-number of directions, i.e. at the transmission angle A1 to the transmission angle AN. The transmission angle A1 to the transmission angle AN may be predetermined directions. The transmission angle A1 to the transmission angle AN are assigned, for example, in a range between −X degrees and X degrees. Here, X is not particularly limited, and is, for example, a value between 1 and 10.

Figure 5:
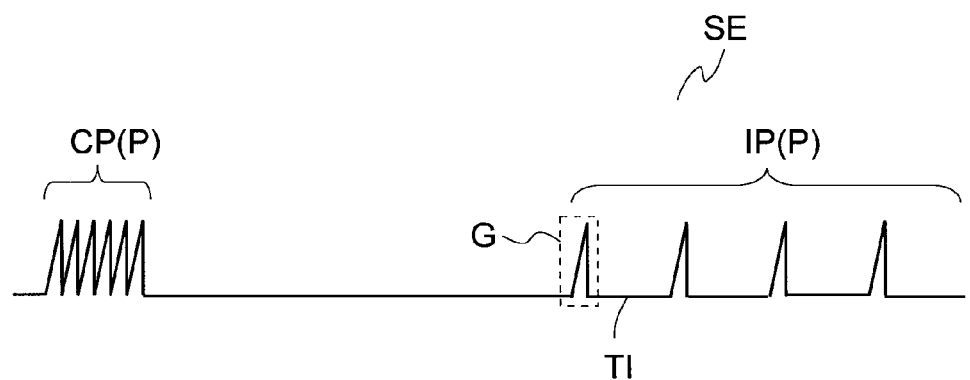
FIG. 5 is view illustrating the pattern of the transmission wave which is transmitted at each transmission angle.

FIG. 5 is a view illustrating the patterns of the transmission wave TW which is transmitted at the individual transmission angles A1 to AN. Each of waveform sets SE shown in FIG. 5 is a set of a plurality of chirp waves (modulated waves) usable to derive information on targets. In information on targets, for example, the distances and relative velocities of the targets can be included. In the present embodiment, the waveform sets SE for the plurality of transmission angles A1 to AN have the same pattern. However, timings to transmit the transmission wave TW at the transmission angles A1 to AN are different from one another. While the transmission wave TW is being transmitted at a certain transmission angle, the transmission wave TW is not transmitted at the other transmission angles.

Also, the patterns of the waveform sets SE corresponding to the individual transmission angles A1 to AN are set by the transmission control unit 31. The transmission control unit 31 may set the patterns of the waveform sets SE according to setting patterns proposed in the design phase in advance. Setting patterns which are proposed in design phase can be stored, for example, in the memory 33. Setting patterns which are proposed in design phase may include patterns switchable according to information which is obtained from the inside of the vehicle (internal information). For example, the patterns of the waveform sets SE may be changed according to the velocity of the vehicle. Also, as another example, the transmission control unit 31 may be configured to dynamically change the patterns of the waveform sets SE according to external information such as information which is acquired from the radar device 1, information which is acquired from a communication network and the like, and so on. For example, waveform sets SE having appropriate patterns may be generated according to target positions (distances and directions). In this case, transmission of a transmission wave TW may be performed by generating a transmission signal according to the generated patterns by the signal generating unit 11.

As shown in FIG. 4 and FIG. 5, in the present embodiment, each waveform set SE includes a plurality of waveform patterns P. Each waveform set SE includes one continuous waveform pattern CP and one intermittent waveform pattern IP. Each continuous waveform pattern CP is a pattern composed of a plurality of waveforms continuously arranged. Specifically, in each continuous waveform pattern CP, a plurality of chirp waves is continuously arranged without setting time intervals. In each intermittent waveform pattern IP, a plurality of waveform groups G each of which includes at least one waveform is arranged at time intervals TI. In the present embodiment, each of waveform groups G constituting each intermittent waveform pattern IP has only one chirp wave (modulated wave). Therefore, in the present embodiment, each intermittent waveform pattern IP is a pattern in which one chirp wave (one waveform) is repeated a plurality of times at time intervals TI. Each time interval TI is a value obtained by subtracting the modulation time Tm from the chirp cycle Tc. Hereinafter, each time interval TI will also referred to as an idle running time TI.

Also, in the present embodiment, all of the chirp waves which are included in the continuous waveform patterns CP have the same waveform. All of the chirp waves which are included in the intermittent waveform patterns IP also have the same waveform. Further, the chirp waves which are included in the continuous waveform patterns CP and the chirp waves which are included in the intermittent waveform patterns IP have the same waveform.

The signal generating unit 11 generates a first transmission signal including at least one chirp signal (an example of a modulated signal of the present invention), as a transmission signal related to the transmission wave TW to be output at a first angle, a plurality of times, at intervals of a predetermined idle running time TI. Also, the signal generating unit 11 generates a third transmission signal in which a plurality of chirp signals (an example of a modulated signal of the present invention) continues, as a transmission signal related to the transmission wave TW to be output at the first angle, in a time period different from the time period when the signal generating unit generates the plurality of first transmission signals. In the present embodiment, the first angle is the transmission angle A1. Each first transmission signal is composed of one chirp signal. The third transmission signal is transmitted before the plurality of first transmission signals is transmitted. By the plurality of first transmission signals, the chirp waves are sequentially transmitted from the transmission antennae 13, at intervals of the idle running time TI. This corresponds to the intermittent waveform pattern IP shown in FIG. 5. By the third transmission signal, the chirp waves are continuously transmitted from the transmission antennae 13. This corresponds to the continuous waveform pattern CP shown in FIG. 5. In other words, the pattern of the transmission wave TW to be transmitted at the transmission angle A1 becomes the pattern shown in FIG. 5 described above.

The signal generating unit 11 generates second transmission signals each of which includes at least one chirp signal (an example of a modulated signal of the present invention), as transmission signals related to the transmission wave TW to be output at second angles different from the first angle, in each interval of the idle running time TI. In the present embodiment, each second transmission signal is composed of one chirp signal. Each chirp signal is identical to the chirp signals of the first transmission signals. In other words, the signal generating unit 11 performs generation of second transmission signals, a plurality of times, at intervals of the idle running time TI, similarly to the case of the first angle. Also, similarly to the case of the first angle, even with respect to each second angle, the signal generating unit 11 generates a third transmission signal (which is a transmission signal related to the transmission wave TW to be output at the corresponding second angle) in which a plurality of chirp signals continues, in a time period different from the time period when the signal generating unit generates the plurality of second transmission signals. In the present embodiment, each third transmission signal is identical to the third transmission signal for the first angle. The third transmission signals are transmitted before the plurality of second transmission signals is transmitted. In other words, in the present embodiment, the pattern of the transmission wave TW for each second angle is the same as the pattern of FIG. 5 described above.

In the present embodiment, the second angles include all of the predetermined angles at which the radar device 1 transmits the transmission wave TW, except for the first angle. The signal generating unit 11 sequentially generates second transmission signals corresponding to all angles except for the first angle, in each interval of the idle running time TI. Specifically, the second angles include the transmission angles A2 to AN of the transmission angles A1 to AN, except for the transmission angle A1. The signal generating unit 11 sequentially generates the second transmission signals corresponding to the transmission angles A2 to AN in each interval of the idle running time TI. The number of second transmission signals which are generated in each interval of the idle running time TI is N−1. Therefore, during transmission of the intermittent waveform pattern IP for the transmission angle A1, in each transmission interval between two chirp waves for the transmission angle A1 (each interval of the idle running time TI), one chirp wave of each of the intermittent waveform patterns IP for the other transmission angles A2 to AN is transmitted.

In the example shown in FIG. 4, first, the continuous waveform pattern CP for the transmission angle A1 is transmitted from the transmission antennae 13. If transmission of the continuous waveform pattern CP for the transmission angle A1 finishes, transmission of the continuous waveform pattern CP for the transmission angle A2 is performed. Thereafter, similarly, the continuous waveform patterns CP for the transmission angle A3 to the transmission angle AN are sequentially transmitted.

If transmission of all of the continuous waveform patterns CP for the transmission angle A1 to the transmission angle AN finishes, subsequently, transmission of the intermittent waveform pattern IP for the transmission angle A1 is started. At this time, between transmission of the first chirp wave of the intermittent waveform pattern IP and transmission of the second chirp wave, an interval of the idle running time TI occurs. In this interval of the idle running time TI, the first chirp waves of the intermittent waveform patterns IP for the transmission angle A2 to the transmission angle AN are sequentially transmitted. If the interval of the idle running time TI ends, the second chirp wave for the transmission angle A1 is transmitted. Subsequently, similarly to the case of the first chirp wave of the intermittent waveform pattern IP for the transmission angle A1, in an interval of the idle running time TI immediately before transmission of the third chirp wave of the intermittent waveform pattern IP for the transmission angle A1, the second chirp waves of the intermittent waveform patterns IP for the transmission angle A2 to the transmission angle AN are sequentially transmitted. Thereafter, by the same processing, the third and subsequent chirp waves for the transmission angles A1 to AN are sequentially transmitted. If all chirp waves of the intermittent waveform patterns IP for the transmission angles A1 to AN are transmitted, one cycle of transmission of the transmission wave TW for acquiring target information finishes. After each cycle finishes, if an appropriate time elapses, the next cycle is started.

In the present embodiment, transmission of the transmission wave TW is performed sequentially in order from the transmission angle A1 to the transmission angle AN; however, this is merely an example. The transmission start angle of the transmission angle A1 to transmission angle AN and the order of angles for transmission may be appropriately changed. In some cases, the order of angles for transmitting the continuous waveform patterns CP and the order of angles for transmitting the intermittent waveform patterns IP may be different from each other.

The transmission time Ttx1 of each continuous waveform pattern CP is the same for all of the transmission angles A1 to AN. Therefore, the time required to transmit all of the continuous waveform patterns CP for the transmission angles A1 to AN is N×Ttx1. The transmission time Ttx2 of each intermittent waveform pattern IP also is the same for all of the transmission angles A1 to AN. Further, each transmission time Ttx2 includes an interval of the idle running time TI. In the present embodiment, as described above, in each interval of the idle running time TI in intermittent waveform pattern IP for the transmission angle A1, chirp waves for the other transmission angles need to be transmitted. To this end, Tc is set to be equal to or larger than N×Tm. Tc is the chirp cycle, and Tm is the modulation time of each chirp wave, and N is the number of transmission angles at which the transmission wave TW needs to be transmitted. Therefore, the time required to transmit all chirp waves of the intermittent waveform patterns IP for the transmission angles A1 to AN is Ttx2 at most. Here, the reason why the corresponding time becomes Ttx2 at most is as follows. During transmission of the last chirp waves for the transmission angles A1 to AN, before the last interval of the idle running time TI in the intermittent waveform pattern IP for the transmission angle A1 ends, transmission of the last chirp wave for the transmission angle AN may finish. In this case, the time required to transmit all the chirp waves of the intermittent waveform patterns IP for the transmission angles A1 to AN is shorter than Ttx2. Therefore, the time T_total required to transmit all chirp waves included in the waveform sets SE for the transmission angles A1 to AN satisfies the following Expression 1.

$$T\_total \le N \times Ttx1 + Ttx2 \tag{1}$$

Figure 6:
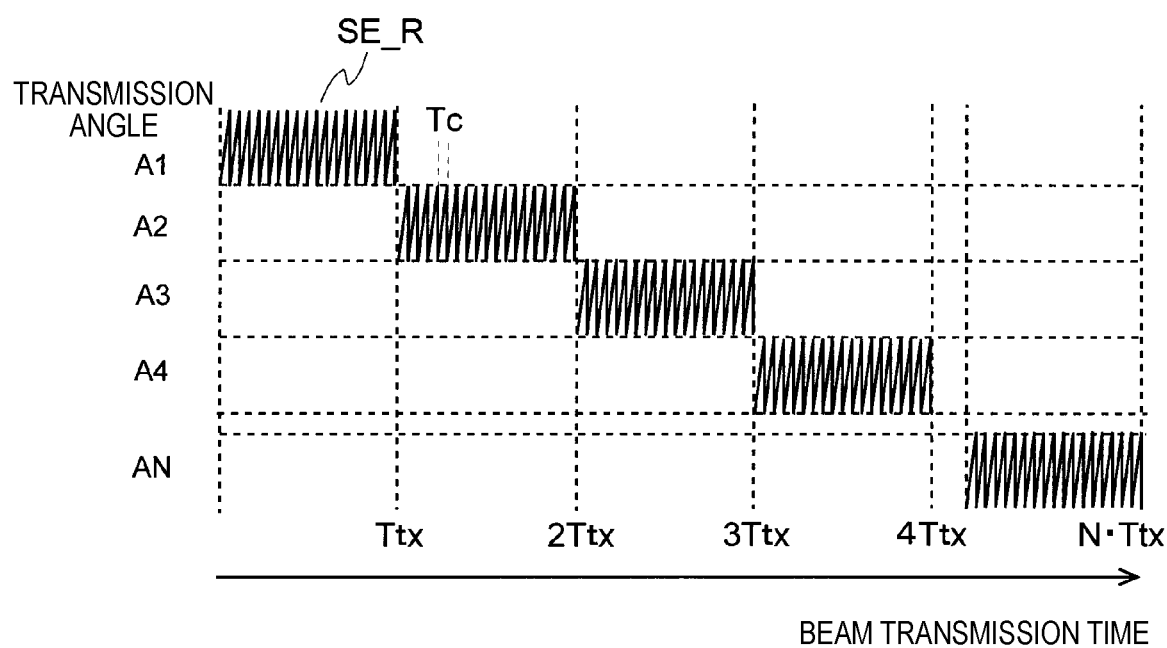
FIG. 6 is a schematic diagram for explaining transmission processing of a comparative example.

FIG. 6 is a schematic diagram for explaining transmission processing of a comparative example. In the comparative example shown in FIG. 6, with respect to the transmission angles A1 to AN, waveform sets SE_R are configured with only continuous waveform patterns. The waveform sets SE_R, for the transmission angles A1 to AN have the same pattern. The shape of each chirp wave of the waveform sets SE_R is the same as the shape of each chirp wave of the waveform sets SE shown in FIG. 4 and FIG. 5. The transmission time of each waveform set SE_R is Ttx.

In the comparative example shown in FIG. 6, first, a plurality of chirp waves constituting the waveform set SE_R for the transmission angle A1 is transmitted. If transmission of all chirp waves constituting the waveform set SE_R for the transmission angle A1 finishes, transmission of a plurality of chirp waves constituting the waveform set SE_R for the transmission angle A2 is performed. Thereafter, similarly, a plurality of chirp waves constituting the waveform sets SE_R for the transmission angle A3 to the transmission angle AN are sequentially transmitted. In this case, the time Tr_total required to transmit all chirp waves included in the waveform sets SE_R for the transmission angles A1 to AN satisfies the following Expression 2.

$$Tr\_total = N \times Ttx \tag{2}$$

In the present embodiment, in order to achieve capability equivalent to that of the comparative example in acquiring velocity information, each waveform set SE is configured to have a continuous waveform pattern CP and an intermittent waveform pattern IP. The details of the method of acquiring velocity information will be described below. The transmission time Ttx1 of each continuous waveform pattern CP is set to be shorter than the transmission time Ttx of all chirp waves constituting each waveform set SE_R. In other words, the time Ttx1 is shorter than the time Ttx. This reduction in transmission time is implemented by a reduction in the number of chirp waves. Also, the transmission time Ttx2 of each intermittent waveform pattern IP is equal to the transmission time Ttx of all chirp waves constituting each waveform set SE_R. In other words, the time Ttx2 is equal to the time Ttx. The number of chirp waves of each intermittent waveform pattern IP is set to be smaller than the number of chirp waves of each waveform set SE_R.

In the present embodiment, during transmission of the intermittent waveform pattern IP for a transmission angle, in each interval of the idle running time TI caused by thinning out chirp waves, chirp waves for the other transmission angles are transmitted. Therefore, as compared to the comparative example, it is possible to reduce the transmission time required to transmit all chirp waves included in the waveform sets for the transmission angles A1 to AN. In other words, it is unnecessary to reduce the number of transmission angles in order to reduce the time, and it is possible to reduce the beam transmission time for acquiring target information while suppressing the angle measurement capability from declining.

This effect will be described taking a specific example. Here, it is assumed as an example that the number of transmission angles, i.e. N is 5. In the comparative example, the transmission time Ttx of all chirp waves constituting each waveform set SE_R is, for example, 7 seconds. In this case, the time Tr_total required to transmit all chirp waves included in the waveform sets SE_R for the transmission angles A1 to A5 becomes 35 ms (=5×7) by Expression 2. In the present embodiment, in order to achieve capability equivalent to that of the comparative example in acquiring velocity information, the transmission time Ttx1 of each continuous waveform pattern CP is set, for example, to about 1/10 of the transmission time Ttx of all chirp waves constituting each waveform set SE_R. In other words, for example, the transmission time Ttx1 is set to 0.7 ms. As described above, the transmission time Ttx2 of each intermittent waveform pattern IP is equal to the transmission time Ttx of all chirp waves constituting each waveform set SE_R. Therefore, the transmission time Ttx2 is 7 ms. Therefore, the time T_total required to transmit all chirp waves included in the waveform sets SE for the transmission angles A1 to A5 becomes 10.5 ms (=5×0.7+7) at most by Expression 1. Therefore, as compared to the case of the comparative example (35 ms), the configuration of the present embodiment can reduce the transmission time.

1-3. Details of Signal Processing

Figure 7:
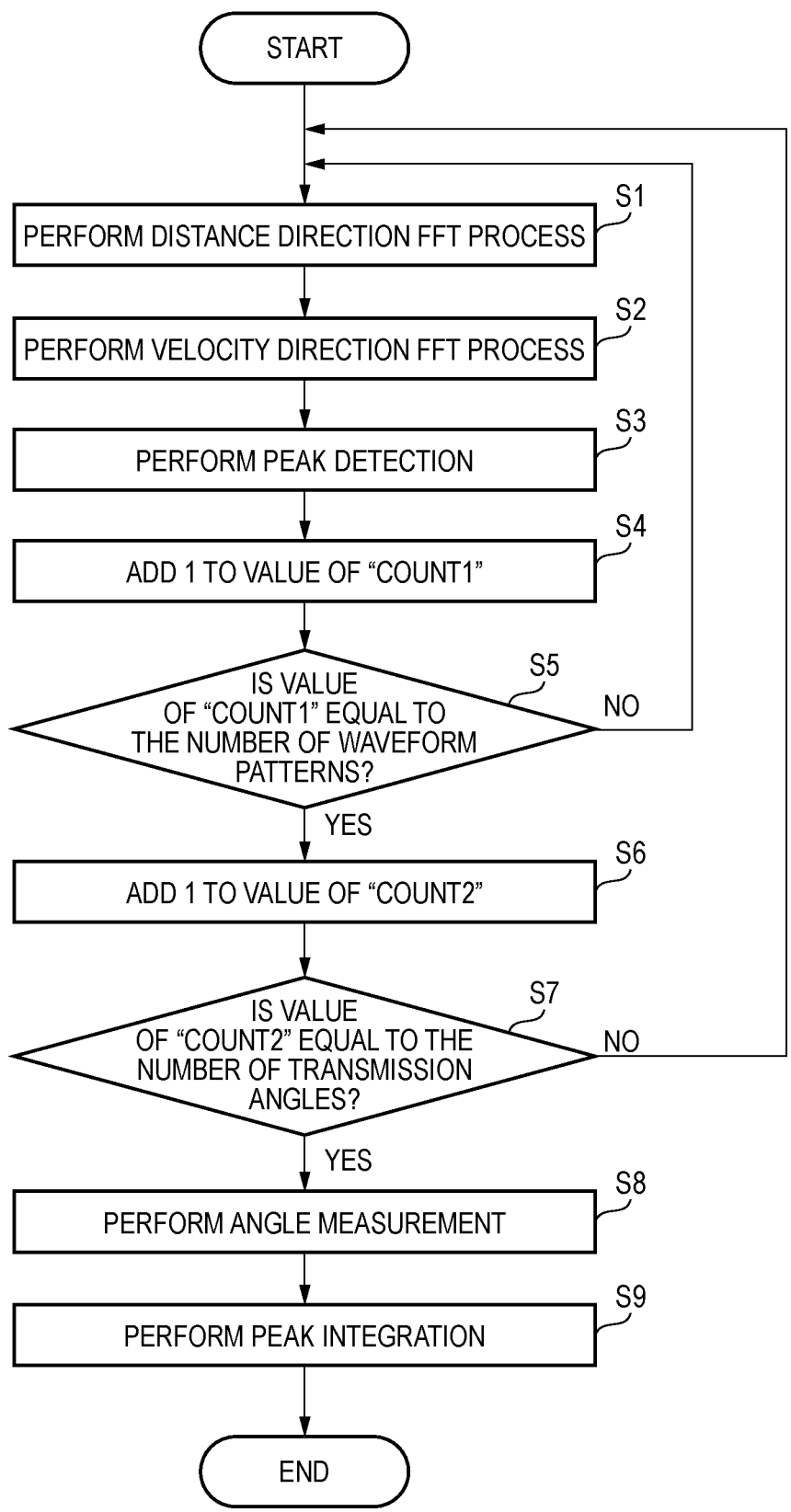
FIG. 7 is a flow chart illustrating an example of signal processing which is performed by the radar device of the first embodiment.

Now, the details of signal processing which is performed by the deriving unit 32 will be described. FIG. 7 is a flow chart illustrating an example of signal processing which is performed by the radar device 1 of the first embodiment.

First, the deriving unit 32 performs signal processing based on first reception signals received as the results of transmission of the continuous waveform pattern CP for the transmission angle A1 by the receiving units 20. Specifically, the frequency analyzing unit 321 performs the distance direction FFT process (STEP S1). The distance direction FFT process is performed on each of beat signals obtained by the chirp waves included in the continuous waveform pattern CP.

If the distance direction FFT process on every beat signal finishes, the frequency analyzing unit 321 performs a velocity direction FFT process (STEP S2). The velocity direction FFT process is performed on the frequency spectra obtained by the distance direction FFT process after the frequency spectra are arranged in chronological order. By the velocity direction FFT process, a two-dimensional power spectrum having a distance bin axis and a velocity bin axis is obtained.

If the velocity direction FFT process finishes, the peak extracting unit 322 detects peaks based on the obtained two-dimensional power spectrum (STEP S3). On the basis of the detected peaks, the distance/relative-velocity calculating unit 324 calculates the distances and relative velocities of targets based on the transmission of the continuous waveform pattern CP. The distance direction FFT process converts components changed according to the distances of targets into frequencies. Such frequencies appear as peaks.

Therefore, it is possible to obtain the distances of targets on the basis of distance bins at which peaks appear. In the result of the velocity direction FFT process, peaks occur at frequencies based on phase changes according to the relative velocities of targets. Therefore, it is possible to obtain the relative velocities of targets on the basis of velocity bins at which peaks appear.

If peak detection finishes, the deriving unit 32 adds "1" to the value of "count1" (STEP S4). The value of "count1" is set to 0 in advance when the flow starts. Subsequently, the deriving unit 32 checks whether the value of "count1" is equal to the number of waveform patterns (STEP S5). In the case where the value of "count1" is not equal to the number of waveform patterns ("No" in STEP S5), the radar device returns to STEP S1, and repeats STEP S1 to STEP S5. Meanwhile, in the case where the value of "count1" is equal to the number of waveform patterns ("Yes" in STEP S5), the radar device proceeds to the next step, i.e. STEP S6.

By the way, in the present embodiment, since each waveform set SE includes one continuous waveform pattern CP and one intermittent waveform pattern IP, the number of waveform patterns is 2. Therefore, at that moment, since only processing on the continuous waveform pattern CP has finished, the value of "count1" is 1, and is not equal to the number of waveform patterns. In other words, the determination result of STEP S5 is No. Therefore, the radar device returns to STEP S1.

After returning to STEP S1, signal processing on second reception signals received as the result of transmission of the intermittent waveform pattern IP for the transmission angle A1 by the receiving units 20 is started. This signal processing is performed when transmission of all chirp waves of the intermittent waveform pattern IP has finished and reception related to the corresponding transmission has finished. Since the processing contents of STEP S1 to STEP S5 are the same as described above, a detailed description thereof will not be made. By these processes, the distances and relative velocities of targets based on the transmission of the intermittent waveform pattern IP are calculated. Then, in STEP S5, the value of "count1" becomes equal to the number of waveform patterns. Therefore, the radar device proceeds to STEP S6.

In STEP S6, the deriving unit 32 adds "1" to the value of "count2". The value of "count2" is set to "0" in advance when the flow starts. The deriving unit 32 checks whether the value of "count2" is equal to the number of transmission angles (STEP S7). In the case where the value of "count2" is not equal to the number of transmission angles ("No" in STEP S7), the radar device returns to STEP S1, and repeats STEP S1 to STEP S7. Meanwhile, in the case where the value of "count2" is equal to the number of transmission angles ("Yes" in STEP S7), the radar device proceeds to the next step, i.e. STEP S8.

By the way, in the present embodiment, as described above, the number of transmission angles is N (>1). Also, at that moment, since only processing related to the transmission angle A1 has finished, the value of "count2" is 1, and is not equal to the number of transmission angles, i.e. N. In other words, the determination result of STEP S7 becomes No. Therefore, the radar device returns to STEP S1.

After returning to STEP S1, according to STEP S1 to STEP S5, (a) signal processing based on first reception signals received as the results of transmission of the continuous waveform pattern CP for the transmission angle A2 by the receiving units 20, and (b) signal processing based on second reception signals received by transmission of the intermittent waveform pattern IP for the transmission angle A2 are sequentially performed. If the sequence of signal processing finishes, "1" is added to the value of "count2" (STEP S6), and whether the value of "count2" is equal to the number of transmission angles (STEP S7). Until the value of "count2" becomes equal to the number of transmission angles, i.e. N, STEP S1 to STEP S7 are repeated.

If the value of "count2" becomes the number of transmission angles, i.e. N, the azimuth calculating unit 323 obtains the azimuths of targets from the radar device 1 (STEP S8). In the present embodiment, the transmission wave TW is transmitted to the plurality of directions, and when the transmission wave is transmitted to a certain direction, if the reflected wave from a target is received, the corresponding direction is specified as the azimuth of the target. As a specific algorithm for angle measurement, a known algorithm can be used. Therefore, a detailed description thereof will not be made.

If angle measurement finishes, the distance/relative-velocity calculating unit 324 integrates the velocity measurement results based on the plurality of waveform patterns CP and IP included in the waveform sets SE, and obtains the relative velocities of targets (STEP S9). By the FFT processes according to the transmission of the waveform patterns CP and IP, a plurality of peaks may be detected. In this case, on the basis of the distances and azimuths of the individual peaks, peaks corresponding to the same target are specified. Subsequently, with respect to peaks corresponding to the same target, on the basis of the combination of relative velocities calculated from the plurality of waveform patterns CP and IP, the relative velocity of the corresponding target is determined. However, peak integration processing which is performed in STEP S9 may be performed between STEP S6 and STEP S7.

In other words, in the present embodiment, the deriving unit 32 determines the relative velocities of targets by combining first relative velocities calculated on the basis of the first reception signals received as the results of transmission of the continuous waveform patterns CP for the transmission angles A1 to AN by the receiving units 20, and second relative velocities calculated on the basis of the second reception signals received as the results of transmission of the intermittent waveform patterns IP by the receiving units 20. For example, the deriving unit 32 determines the relative velocities of targets by combining a plurality of relative velocities derived on the basis of reception signals acquired by transmitting the transmission wave TW based on a plurality of first transmission signals and the transmission wave TW based on third transmission signals. According to this configuration, it is possible to accurately detect the relative velocities of targets. Hereinafter, this configuration will be described taking a specific example.

In the case where the plurality of chirp waves constituting the waveform sets SE_R of the comparative example shown in FIG. 6 is transmitted, the detectable velocity range Vmax is 200 km/h, and the velocity resolution Vmin is 1 km/h.

In general, the chirp cycle Tc is related to the detectable velocity range Vmax. If the chirp cycle Tc lengthens, the detectable velocity range Vmax decreases, whereas if the chirp cycle Tc shortens, the detectable velocity range Vmax increases. Also, the waveform transmission time is related to the velocity resolution Vmin. If the waveform transmission time lengthens, the value of the velocity resolution Vmin decreases (the resolution capability improves); whereas if the waveform transmission time shortens, the value of the velocity resolution Vmin increases (the resolution capability deteriorates).

Each continuous waveform pattern CP has the same chirp cycle Tc as that in the waveform sets SE_R of the comparative example, and has the waveform transmission time shorter as that in the waveform sets SE_R. Therefore, in the case where the continuous waveform patterns CP are transmitted, the value of the detectable velocity range Vmax is the same as that in the comparative example, and the value of the velocity resolution Vmin is larger than that in the comparative example. In the present embodiment, in the case where the continuous waveform patterns CP are transmitted, the detectable velocity range Vmax is set to 200 km/h, and the velocity resolution Vmin is set to 100 km/h.

Meanwhile, each intermittent waveform pattern IP has the chirp cycle Tc longer than that in the waveform sets SE_R of the comparative example, and has the same waveform transmission time as that in the comparative example. Therefore, in the case where the intermittent waveform patterns IP are transmitted, the value of the detectable velocity range Vmax is smaller than that in the comparative example, and the value of the velocity resolution Vmin is the same as that in the comparative example. In the present embodiment, in the case where the intermittent waveform patterns IP are transmitted, the detectable velocity range Vmax is set to 100 km/h, and the velocity resolution Vmin is set to 1 km/h.

Figure 8:
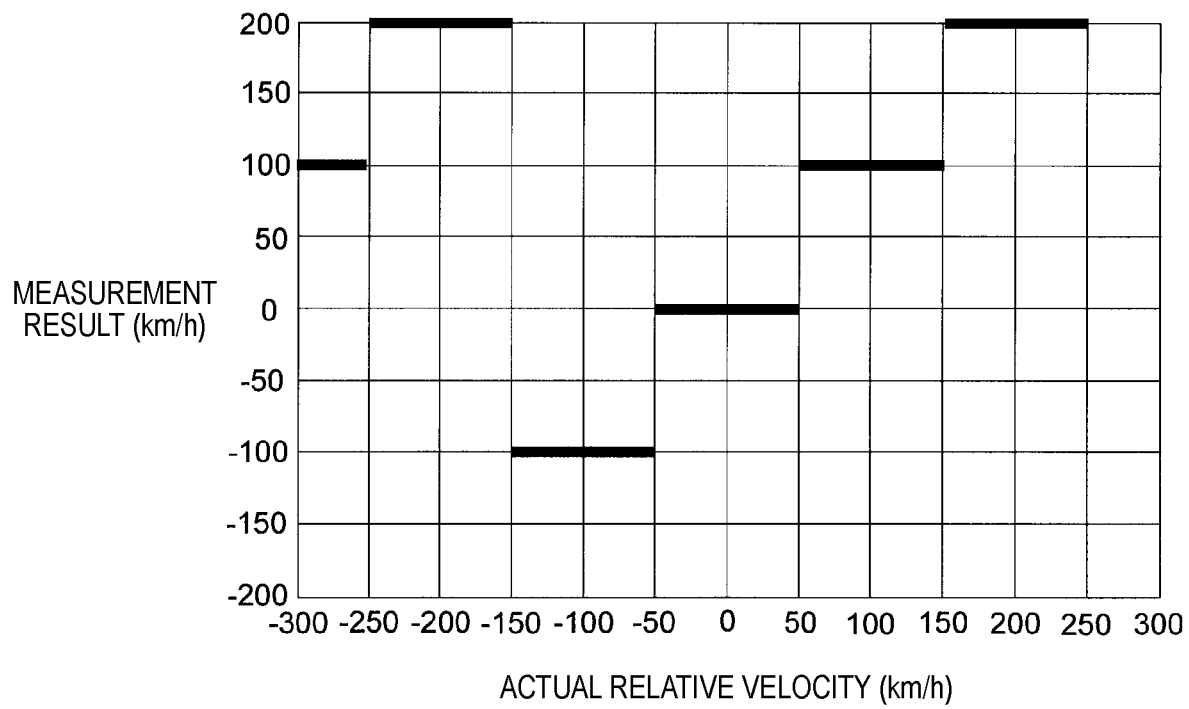
FIG. 8 is a view illustrating actual relative velocities and measurement results in the case of performing velocity measurement with continuous waveform patterns.

FIG. 8 is a view illustrating actual relative velocities and measurement results in the case of performing velocity measurement using the continuous waveform patterns CP. As shown in FIG. 8, in the case of performing velocity measurement using the continuous waveform patterns CP, the detectable velocity range Vmax is 200 km/h, and in a range between −100 km/h and +200 km/h, it is possible to detect relative velocities at fine resolution, i.e. at the velocity resolution Vmin of 100 km/h. Therefore, even in the case where the detectable velocity range Vmax is set to 200 km/h equal to that in the comparative example, detection of relative velocities can be performed at fine resolution, like −100 km/h, 0 km/h, +100 km/h, and +200 km.

Figure 9:
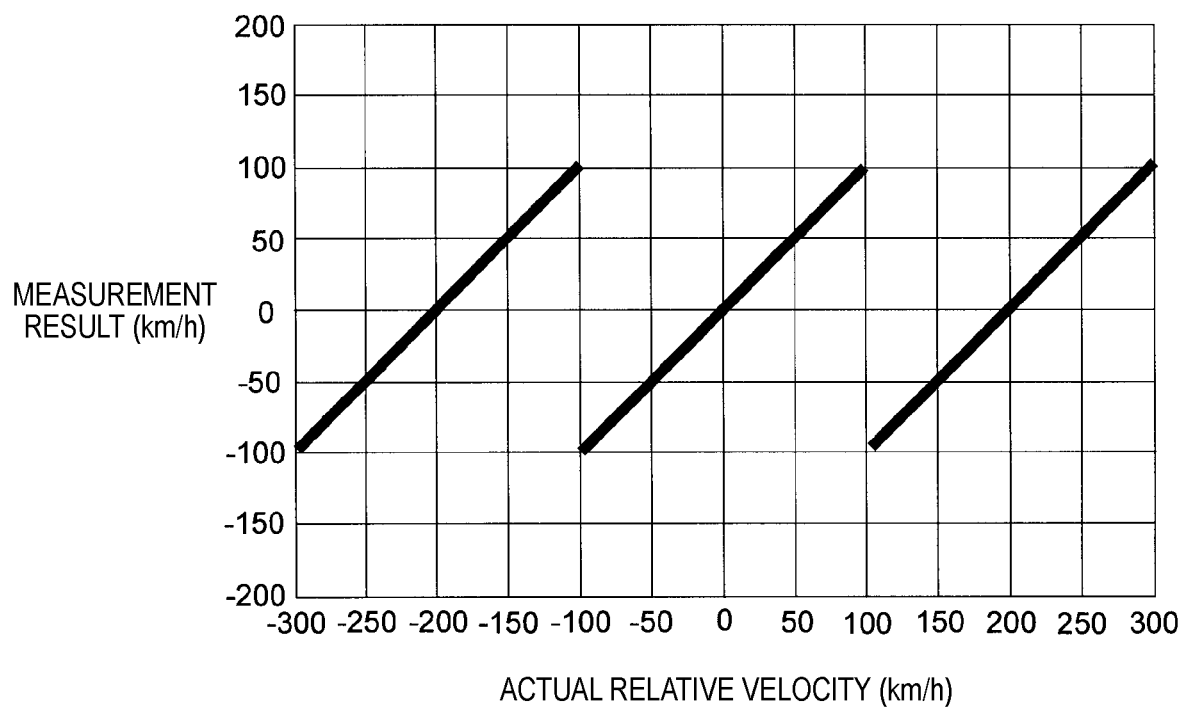
FIG. 9 is a view illustrating actual relative velocities and measurement results in the case of performing velocity measurement with intermittent waveform patterns.

FIG. 9 is a view illustrating actual relative velocities and measurement results in the case of performing velocity measurement using the intermittent waveform patterns IP. As shown in FIG. 9, in the case of performing velocity measurement using the intermittent waveform patterns IP, the detectable velocity range Vmax is 100 km/h, and in a range between −99 km/h and +100 km/h, it is possible to detect relative velocities at the velocity resolution Vmin of 1 km/h, and measurement results coincide with actual measurement velocities. However, if the detectable velocity range Vmax is smaller than that in the comparative example, and an actual relative velocity is out of the range between −100 km/h and +100 km/h, a relative velocity based on a warped signal is detected.

Figure 10:
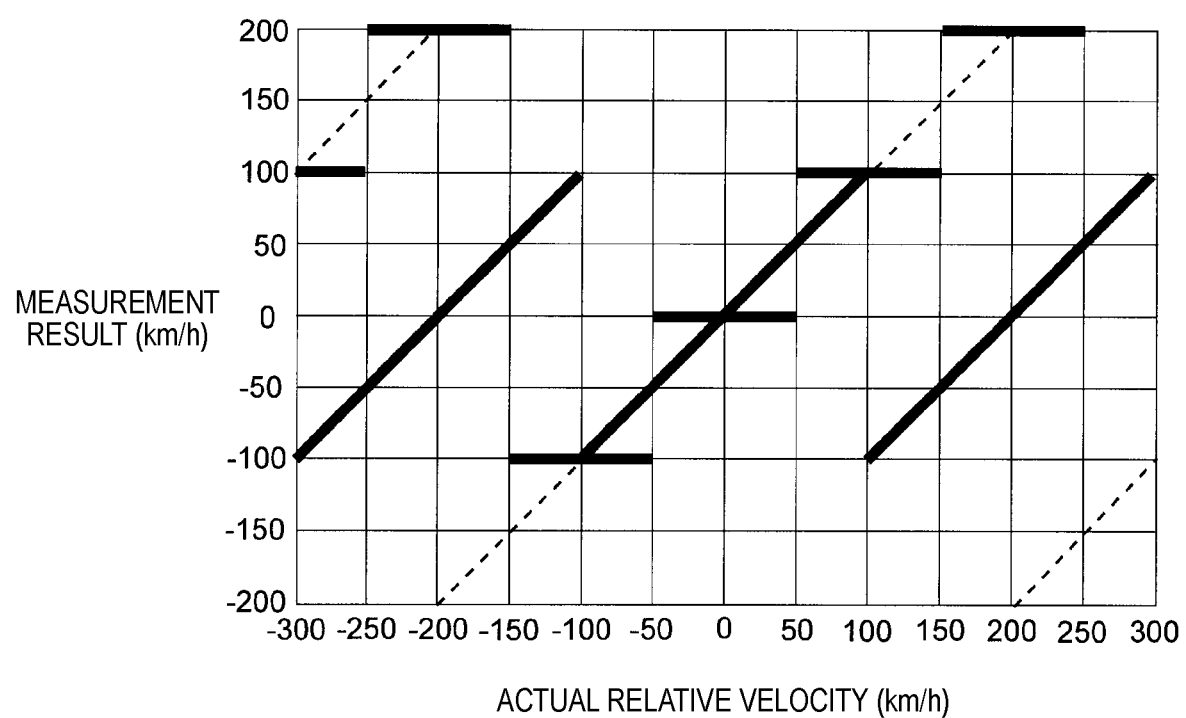
FIG. 10 is a view for explaining integration of two measurement results which are obtained by the continuous waveform patterns and the intermittent waveform patterns.

In view of this point, in the present embodiment, as shown in FIG. 10, the measurement results based on the continuous waveform patterns CP and the measurement results based on the intermittent waveform patterns IP are integrated. Therefore, it is possible to detect the relative velocities of targets in the same detectable velocity range as that in the comparative example at the same velocity resolution as that of the comparative example. However, FIG. 10 is a view for explaining integration of measurement results which are obtained by velocity measurement using the continuous waveform patterns CP and velocity measurement using the intermittent waveform patterns IP.

In the case of performing velocity measurement using the intermittent waveform patterns IP as shown in FIG. 10, if an actual relative velocity is out of the range between −99 km/h and +100 km/h, a relative velocity based on a warped signal is detected. For this reason, if a measurement result V_P1 based on the continuous waveform patterns CP exceeds the detectable velocity range Vmax of the intermittent waveform patterns IP, it is determined that a measurement result V_P2 based on the intermittent waveform patterns IP is attributable to a warped signal. In this case, the measurement result V_P2 based on the intermittent waveform patterns IP is corrected.

For example, if the measurement result V_P2 based on the intermittent waveform patterns IP is +50 km/h, and the measurement result V_P1 based on the continuous waveform patterns CP is 0 km/h, since it is determined that the measurement result V_P2 is not attributable to a warped signal, the measurement result V_P2, i.e. +50 km/h is determined as a measurement result.

Meanwhile, for example, if the measurement result V_P2 based on the intermittent waveform patterns IP is +50 km/h, and the measurement result V_P1 based on the continuous waveform patterns CP is −100 km/h, it is possible to determine that the measurement result V_P2 has been obtained from a warped signal of a signal representing an actual relative velocity in a range between −199 km/h and −100 km/h. In this case, since the velocity from which the measurement result V_P2 of +50 km/h can be obtained is −150 km/h as shown in FIG. 10, −150 km/h is determined as a measurement result.

Also, if the measurement result V_P2 based on the intermittent waveform patterns IP is −50 km/h, and the measurement result V_P1 based on the continuous waveform patterns CP is +200 km/h, it is possible to determine that the measurement result V_P2 has been obtained from a warped signal of a signal representing an actual relative velocity in a range between +101 km/h and −200 km/h. In this case, since the velocity from which the measurement result V_P2 of −50 km/h can be obtained is +150 km/h as shown in FIG. 10, +150 km/h is determined as a measurement result.

However, measurement results corresponding to measurement results V_P2 which are obtained by velocity measurement in the case where warping has occurred may be calculated on the basis of measurement results V_P1 and measurement results V_P2 by a function defined in advance. Also, as another example, measurement results corresponding to measurement results V_P1 and measurement results V_P2 may be stored as a data table in advance, such that if a measurement result V_P1 and a measurement result V_P2 is calculated, a measurement result corresponding to the combination of them can be read out from the data table.

In the present embodiment, in order to reduce the above-described transmission time, the waveform sets SE are configured to include not only the intermittent waveform patterns IP but also the continuous waveform patterns CP. As a result, it is possible to accurately measure the relative velocities of targets. In other words, according to the present embodiment, it is possible to reduce the beat transmission time for acquiring target information while suppressing the angle measurement capability from declining, and it also is possible to accurately measure the relative velocities of targets.

1-4. Modifications

Figure 11:
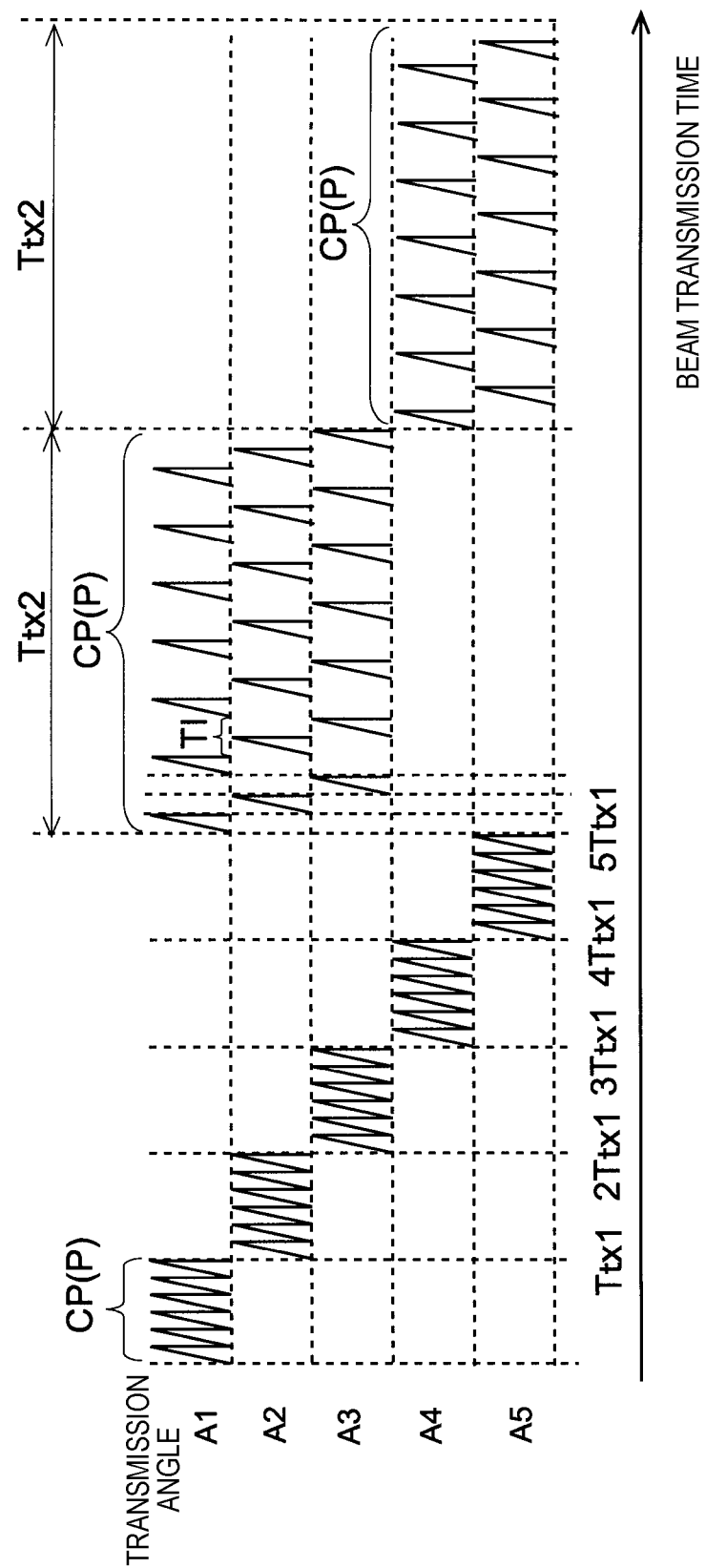
FIG. 11 is a view for explaining a first modification of the first embodiment.

FIG. 11 is a view for explaining a first modification of the first embodiment. Also, in FIG. 11, it is assumed as an example that the number of transmission angles is 5.

In the first embodiment described above, as shown in FIG. 4, the transmitting unit 10 is configured such that in each interval of the idle running time TI in the intermittent waveform pattern IP for the transmission angle A1, the transmitting unit transmits one chirp wave of each of the intermittent waveform patterns IP for the other transmission angles A2 to AN. Therefore, it is possible to efficiently reduce the time required to transmit all chirp waves included in the waveform sets SE for the transmission angles A1 to AN. However, this is an example.

In each interval of the idle running time TI in the intermittent waveform pattern IP for the transmission angle A1, it may be impossible to transmit one chirp wave of each of the intermittent waveform patterns IP for the other transmission angles A2 to AN. In this case, for example, as shown in FIG. 11, in the case where transmission of the intermittent waveform patterns IP for transmission angles A4 and A5 in an interval of the idle running time TI has failed, after transmission of the intermittent waveform pattern IP for the transmission angle A1 finishes, separately, the corresponding intermittent waveform patterns may be transmitted. The present modification shows the case where the second angles of the present embodiment include some transmission angles of all transmission angles at which the radar device 1 transmits the transmission wave TW, except for the first angle. However, the number of second angles of the present embodiment corresponding to transmission angles does not necessarily need to be two or more, and may be one.

In the example shown in FIG. 11, first, the continuous waveform pattern CP for the transmission angle A1 is transmitted from the transmission antennae 13. If transmission of the continuous waveform pattern CP for the transmission angle A1 finishes, transmission of the continuous waveform pattern CP for the transmission angle A2 is performed. Thereafter, similarly, the continuous waveform patterns CP for the transmission angle A3 to the transmission angle A5 are sequentially transmitted.

If transmission of all of the continuous waveform patterns CP for the transmission angle A1 to the transmission angle A5 finishes, subsequently, transmission of the intermittent waveform pattern IP for the transmission angle A1 is started. At this time, between transmission of the first chirp wave of the intermittent waveform pattern IP and transmission of the second chirp wave, an interval of the idle running time TI occurs. In this interval of the idle running time TI, the first chirp waves of the intermittent waveform patterns IP for the transmission angles A2 and A3 are sequentially transmitted. If the interval of the idle running time TI ends, the second chirp wave for the transmission angle A1 is transmitted. Thereafter, similarly to the case of the first chirp wave of the intermittent waveform pattern IP for the transmission angle A1, in an interval of the idle running time TI immediately before transmission of the third chirp wave of the intermittent waveform pattern IP for the transmission angle A1, the second chirp waves of the intermittent waveform patterns IP for the transmission angles A2 and A3 are sequentially transmitted. Thereafter, by the same processing, the third and subsequent chirp waves for the transmission angles A1 to A3 are sequentially transmitted.

If all chirp waves of the intermittent waveform patterns IP for the transmission angles A1 to A3 are transmitted, subsequently, transmission of the intermittent waveform pattern IP for the transmission angle A4 is started. In this case, between transmission of the first chirp wave of the intermittent waveform pattern IP and transmission of the second chirp wave of the intermittent waveform pattern IP, an interval of the idle running time TI occurs. In the interval of the idle running time TI, the first chirp wave of the intermittent waveform pattern IP for the transmission angle A5 is transmitted. If the interval of the idle running time TI ends, the second chirp wave for the transmission angle A4 is transmitted. Subsequently, similarly to the case of the first chirp wave for the transmission angle A4, in an interval of the idle running time TI immediately before transmission of the third chirp wave, the second chirp wave of the intermittent waveform pattern IP for the transmission angle A5 is transmitted. Thereafter, by the same processing, the third and subsequent chirp waves for the transmission angles A4 and A5 are sequentially transmitted. If all chirp waves of the intermittent waveform patterns IP for the transmission angles A4 and A5 are transmitted, one cycle of transmission of the transmission wave TW for acquiring target information finishes. After he one cycle ends, if an appropriate time elapses, the next cycle is started.

In the present modification, the time T_total required to transmit all chirp waves included in the waveform sets SE for the transmission angles A1 to A5 becomes 5×Ttx1+2×Ttx2 at most. Similarly to the above-described example, it is assumed that Ttx1 is Ttx/10, and Ttx2 is Ttx, and Ttx is 7 ms. Ttx is the transmission time of each waveform set SE_R in the comparative example shown in FIG. 6. In this case, the time T_total required to transmit all chirp waves included in the waveform sets SE for the transmission angles A1 to A5 becomes 17.5 ms (=5×0.7+2×7) at most. In the comparative example shown in FIG. 6, as described above, the time required to transmit all chirp waves included in the waveform sets SE_R for the transmission angles A1 to A5 is 35 ms (=5×7) from Expression 2. As compared to this, the configuration of the present modification also can reduce the transmission time.

Figure 12:
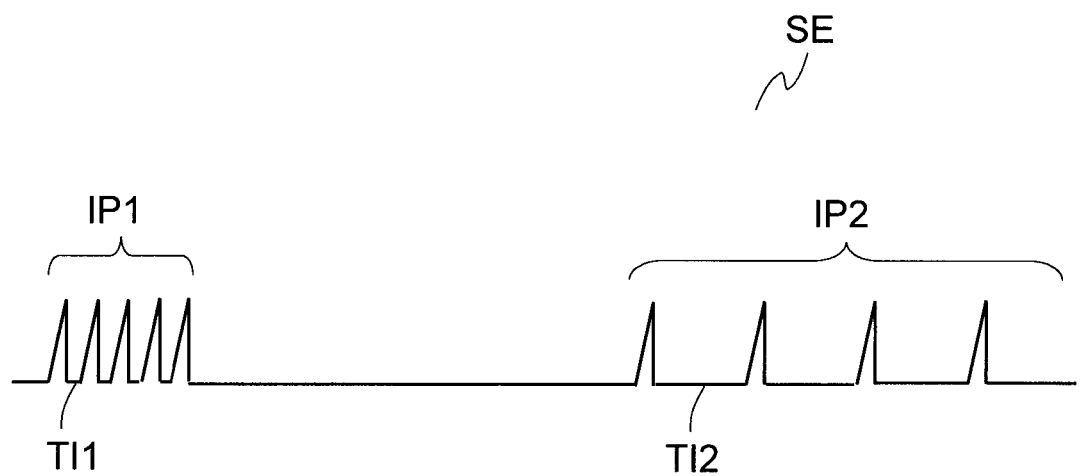
FIG. 12 is a view for explaining a second modification of the first embodiment.

FIG. 12 is a view for explaining a second modification of the first embodiment. In the above-described embodiment, each waveform set SE is configured to include a continuous waveform pattern CP and an intermittent waveform pattern IP. However, this is merely an example. In other words, as shown in FIG. 12, each waveform set SE may include a plurality of different intermittent waveform patterns IP. Further, in this case, while at least one pattern of the plurality of different intermittent waveform patterns IP1 and IP2 is transmitted, in intervals of an idle running time TI, the transmitting unit 10 may transmit waveform groups G for the other angles. In this case, each waveform group G includes at least one waveform. In the present modification, each waveform group G includes only one chirp wave (modulated wave). Therefore, while at least one pattern of the plurality of different intermittent waveform patterns IP1 and IP2 is transmitted, in intervals of the idle running time TI, the transmitting unit 10 transmits chirp waves for the other angles.

Specifically, each waveform set SE has a first intermittent waveform pattern IP1 and a second intermittent waveform pattern IP2. In the present modification, the first intermittent waveform pattern IP1 and the second intermittent waveform pattern IP2 have different idle running times TI. However, this is an example, and, for example, the first intermittent waveform pattern IP1 and the second intermittent waveform pattern IP2 may be configured to have different chirp waveforms.

In the present modification, the idle running time TI1 of the first intermittent waveform pattern IP1 is shorter than the idle running time TI2 of the second intermittent waveform pattern IP2. Therefore, as a beam transmission method, for example, it also is possible to replace each continuous waveform pattern CP shown in FIG. 4 with a first intermittent waveform pattern IP1, and replace each intermittent waveform pattern IP shown in FIG. 4 with a second intermittent waveform pattern IP2. In this case, for example, during transmission of the second intermittent waveform pattern IP2 for the transmission angle A1, in intervals of the idle running time TI2, chirp waves of the second intermittent waveform patterns IP for the other transmission angles A2 to AN are transmitted.

Therefore, even in the present modification, similarly to the first embodiment, it is possible to reduce the time required to transmit all chirp waves included in the waveform sets SE for the transmission angles A1 to AN. Also, in the present modification, even during transmission of the first intermittent waveform pattern IP1, in intervals of the idle running time TI1, it is possible to transmit chirp waves for the other transmission angles. Therefore, it is possible to further reduce the time.

Also, in the present modification, similarly to the first embodiment, the signal generating unit 11 generates a first transmission signal, a plurality of times, at intervals of the predetermined time TI2. Also, the signal generating unit 11 generates a fourth transmission signal including at least one chirp signal (an example of a modulated signal of the present invention), as a transmission signal related to the transmission wave TW to be output at the first angle, a plurality of times, at intervals of the idle running time TI1 different from the idle running time TI2. The plurality of fourth transmission signals is generated in a time period different from the time period when the plurality of first transmission signals is generated. Specifically, the first angle is the transmission angle A1. Each fourth transmission signal is composed of one chirp signal. The plurality of fourth transmission signals is transmitted before the plurality of first transmission signals is transmitted. To this end, the pattern of the transmission wave TW to be transmitted at the transmission angle A1 becomes the pattern of FIG. 12 described above. With respect to the second angles, similarly to the cases of the first angles of the first embodiment and the present modification, the signal generating unit 11 generates a plurality of second transmission signals and a plurality of fourth transmission signals (which are transmission signals related to the transmission wave TW to be output at the second angles). Therefore, even with respect to each of the transmission angles other than the first angle, the transmission wave having the pattern of FIG. 12 described above is transmitted.

Also, in the present modification, it is preferable that, with respect to each transmission angle, the deriving unit 32 should calculate a plurality of relative velocities on the basis of reception signals received as the results of transmission of the individual intermittent waveform patterns IP1 and IP2 by the receiving units 20, and determine the relative velocities of targets by combining the derived relative velocities. As an example, the deriving unit 32 derives a plurality of relative velocities on the basis of reception signals acquired by transmitting the transmission wave TW based on the plurality of first transmission signals and the transmission wave TW based on the plurality of fourth transmission signals, and determines the relative velocities of targets by combining the plurality of derived relative velocities. Even in the present modification, similarly to the case of the first embodiment, using the first intermittent waveform pattern IP1 and the second intermittent waveform pattern IP2, it is possible to perform calculation of relative velocities using a combination of different velocity measurement capabilities (the detectable velocity range Vmax and the velocity resolution Vmin). Therefore, even in the present modification, it is possible to accurately acquire the relative velocities of targets.

Each waveform set SE has been described as having two waveform patterns. However, this is an example, and the number of waveform patterns may be three or more. In the case where the number of waveform patterns is three or more, all of them may be intermittent waveform patterns. Also, in the case where the number of waveform patterns is three or more, at least one intermittent waveform pattern may be included, and one or more continuous waveform patterns may be included.

2. Second Embodiment

Now, a second embodiment will be described. The configuration of a radar device of the second embodiment is the same as the configuration of the radar device 1 of the first embodiment. Therefore, a detailed description of the configuration of the radar device of the second embodiment will not be made. Also, in the following descriptions of parts identical to those of the first embodiment, they are denoted by the same reference symbols. In the second embodiment, each waveform set SE has one intermittent waveform pattern IP. Specifically, each waveform set SE does not include any continuous waveform pattern and any other types of intermittent waveform patterns. In this point, the second embodiment is different from the first embodiment. The following description will be made with a focus on the different point.

Figure 13:
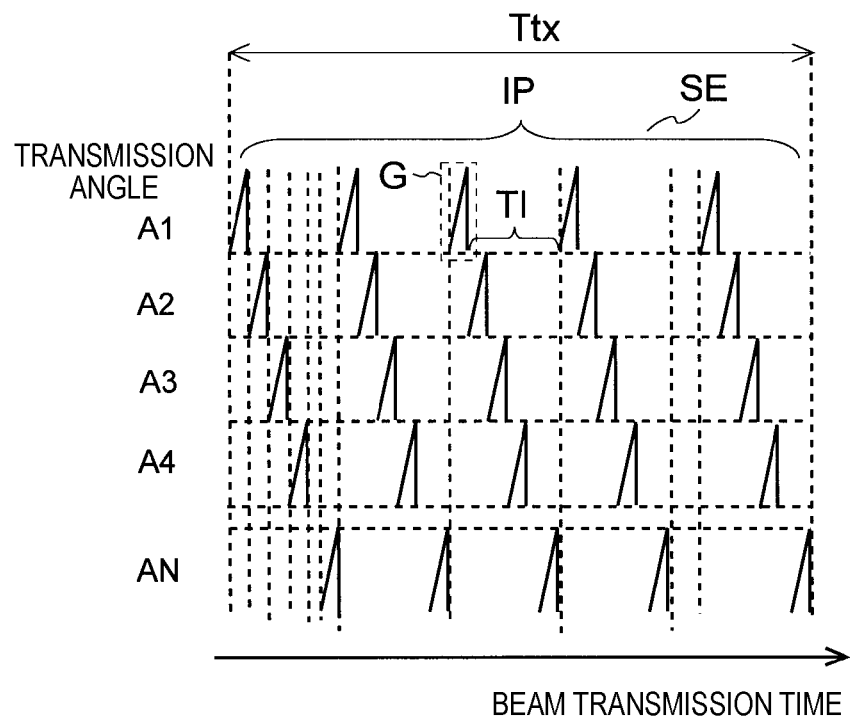
FIG. 13 is a schematic diagram for explaining transmission processing which is performed by a radar device of a second embodiment.

FIG. 13 is a schematic diagram for explaining transmission processing which is performed by the radar device of the second embodiment. As shown in FIG. 13, each intermittent waveform pattern IP has a configuration in which waveform groups G each have at least one waveform and are arranged at intervals of an idle running time TI. In the present embodiment, each waveform group G includes only one chirp wave. Therefore, each intermittent waveform pattern IP has a configuration in which chirp waves (modulated signals) are arranged at intervals of the idle running time TI.

In FIG. 13, the transmission angle A1 to the transmission angle AN are directions to which the transmission wave TW (a beam) is transmitted from the transmission antennae 13. In other words, even in the present embodiment, the transmission wave TW is transmitted to each of N-number of directions, i.e. the transmission angle A1 to the transmission angle AN. In the present embodiment, from the transmission antennae 13, identical intermittent waveform patterns IP are transmitted at the plurality of transmission angles A1 to AN, respectively. However, the timings when the transmission wave TW is transmitted at the transmission angles A1 to AN are different. In the case where the transmission wave TW is transmitted at a certain transmission angle, the transmission wave TW is not transmitted at any other transmission angle.

The signal generating unit 11 generates a first transmission signal including at least one chirp signal (an example of a modulated signal of the present invention), as a transmission signal related to the transmission wave TW to be output at a first angle, a plurality of times, at intervals of a predetermined idle running time IT. In the present embodiment, the first angle is the transmission angle A1. Each first transmission signal is composed of one chirp signal. Therefore, waveform sets SE which are shown in FIG. 13 and each of which has one intermittent waveform pattern IP are obtained.

Also, the signal generating unit 11 generates a second transmission signal including at least one chirp signal (an example of a modulated signal of the present invention), as a transmission signal related to the transmission wave TW to be output at each of second angles different from the first angle, in each interval of the idle running time TI. In the present embodiment, each second transmission signal is composed of one chirp signal. Each chirp signal is identical to the chirp signals of the first transmission signals. In other words, the signal generating unit 11 performs generation of second transmission signals, a plurality of times, at intervals of the idle running time TI, similarly to the case of the first angle. In other words, in the present embodiment, the pattern of the transmission wave TW for each second angle is the same as the pattern of the transmission wave TW for the first angle.

In the present embodiment, the second angles include all of the predetermined angles at which the radar device 1 transmits the transmission wave TW, except for the first angle. The signal generating unit 11 sequentially generates second transmission signals corresponding to all angles except for the first angle, in each interval of the idle running time TI. Specifically, the second angles include the transmission angles A2 to AN of the transmission angles A1 to AN, except for the transmission angle A1. The signal generating unit 11 sequentially generates second transmission signals corresponding to the transmission angles A2 to AN in each interval of the idle running time TI. In each interval of the idle running time TI, (N−1)-number of second transmission signals are generated. Therefore, during transmission of the intermittent waveform pattern IP for the transmission angle A1, in each transmission interval between two chirp waves for the transmission angle A1 (an idle running time TI), one chirp wave of each of the intermittent waveform patterns IP for the other transmission angles A2 to AN is transmitted.

In the present embodiment, first, transmission of the intermittent waveform pattern IP for the transmission angle A1 is started. At this time, between transmission of the first chirp wave of the intermittent waveform pattern IP and transmission of the second chirp wave, an interval of the idle running time TI occurs. In this interval of the idle running time TI, the first chirp waves of the intermittent waveform patterns IP for the transmission angle A2 to the transmission angle AN are sequentially transmitted. If the interval of the idle running time TI ends, the second chirp wave for the transmission angle A1 is transmitted. Subsequently, similarly to the case of the first chirp wave for the transmission angle A1, in an interval of the idle running time TI immediately before transmission of the next chirp wave, the second chirp waves of the intermittent waveform patterns IP for the transmission angle A2 to the transmission angle AN are sequentially transmitted. Thereafter, by the same processing, the third and subsequent chirp waves for the transmission angles A1 to AN are sequentially transmitted. If all chirp waves of the intermittent waveform patterns IP for the transmission angles A1 to AN are transmitted, one cycle of transmission of the transmission wave TW for acquiring target information finishes. After one cycle ends, if an appropriate time elapses, the next cycle is started.

In the present embodiment, the intermittent waveform patterns IP are sequentially transmitted in order from the transmission angle A1 to the transmission angle AN. However, this is merely an example. The transmission start angle of the transmission angle A1 to transmission angle AN and the order of angles for transmission may be appropriately changed.

In the present embodiment, the number of types of waveform patterns which are included in each waveform set SE is one. Therefore, on the basis of reception signals received as the results of transmission of the intermittent waveform patterns IP for the transmission angles A1 to AN by the receiving units 20, the deriving unit 32 obtains the relative velocities of targets. As an example, on the basis of reception signals acquired by transmitting the transmission wave TW based on the plurality of first transmission signals, the deriving unit 32 derives the relative velocities of targets. In the present embodiment, integration of measurement results obtained by a plurality of velocity measurement operations using a plurality of types of waveform patterns to determine relative velocities is not performed.

Figure 14:
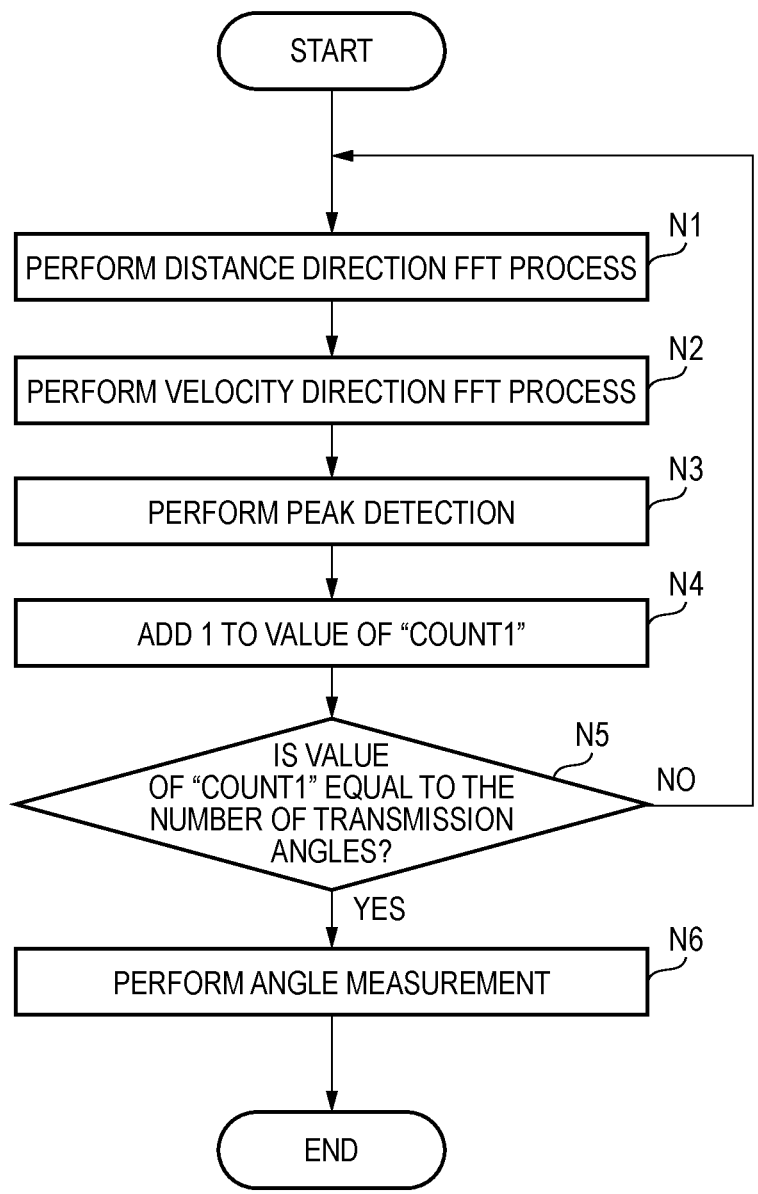
FIG. 14 is a flow chart illustrating an example of signal processing which is performed by the radar device of the second embodiment.

FIG. 14 is a flow chart illustrating an example of signal processing which is performed by the radar device of the second embodiment. First, the deriving unit 32 performs signal processing based on reception signals received as the results of transmission of the intermittent waveform pattern IP for the transmission angle A1 by the receiving units 20. Specifically, the frequency analyzing unit 321 performs the distance direction FFT process (STEP N1). The FFT process is performed on each of beat signals obtained by the chirp waves included in the intermittent waveform pattern IP.

If the distance direction FFT process on every beat signal finishes, the frequency analyzing unit 321 performs a velocity direction FFT process (STEP N2). The velocity direction FFT process is performed on the frequency spectra obtained by the distance direction FFT process after the frequency spectra are arranged in chronological order. By the velocity direction FFT process, a two-dimensional power spectrum having a distance bin axis and a velocity bin axis is obtained.

If the velocity direction FFT process finishes, the peak extracting unit 322 detects peaks based on the obtained two-dimensional power spectrum (STEP N3). On the basis of the detected peaks, the distance/relative-velocity calculating unit 324 calculates the distances and relative velocities of targets.

If calculating the distances and relative velocities of targets, the deriving unit 32 adds "1" to the value of "count1" (STEP N4). The value of "count1" is set to 0 in advance when the flow starts. The deriving unit 32 checks whether the value of "count1" is equal to the number of transmission angles (STEP N5). In the case where the value of "count1" is not equal to the number of transmission angles ("No" in STEP N5), the radar device returns to STEP N1, and repeats STEP N1 to STEP N5.

In the case where the value of "count1" is equal to the number of transmission angles ("Yes" in STEP N5), the azimuth calculating unit 323 obtains the azimuths of targets from the radar device 1 (STEP N6). In the present embodiment, the transmission wave TW is transmitted to the plurality of directions, and in the case where the transmission wave is transmitted to a certain direction, if the reflected wave from a target is received, the corresponding direction is specified as the azimuth of the target. In this way, the distances, relative velocities, and azimuths (angles) of targets are obtained.

For example, in the case of making the width of each chirp wave sufficiently narrow (making the modulation time Tm short) by an improvement in the performance of the A/D converters 23 and so on, it is possible to sufficiently increase the maximum detectable velocity Vmax. In such cases, sometimes, if the maximum detectable velocity Vmax is sacrificed to some extent, it is possible to implement desired velocity detection capability. In other words, sometimes, if the number of chirp waves in each waveform set is reduced, although the maximum detectable velocity Vmax decreases, desired velocity detection capability can be implemented. In such cases, the configuration of the second embodiment is very effective. According to the configuration of the second embodiment, in each interval of the idle running time TI caused by decreasing the number of chirp waves, it is possible to transmit chirp waves for the other transmission angles. Therefore, it is possible to reduce the time required to transmit all chirp waves included in the waveform sets SE for the transmission angles A1 to AN.

Figure 15:
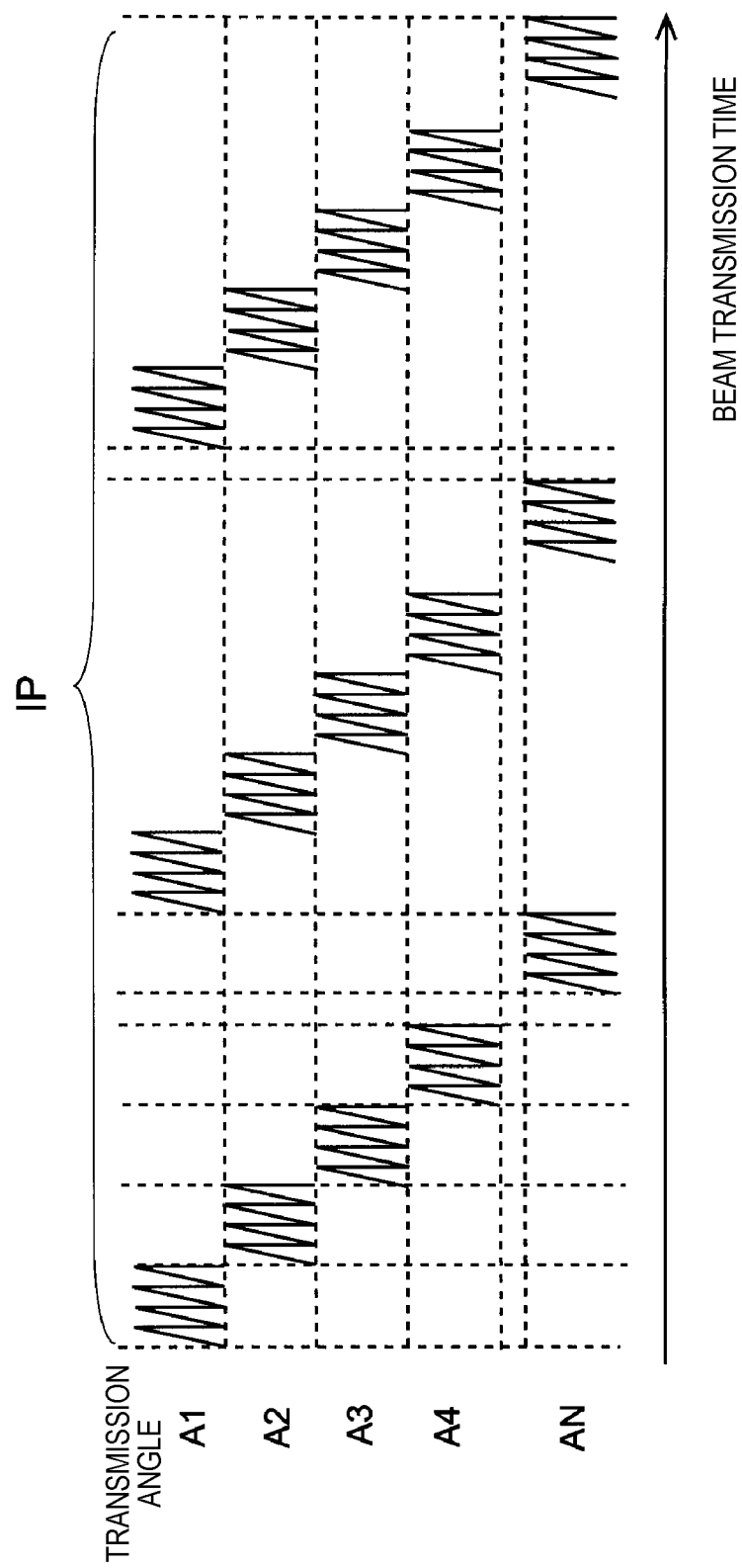
FIG. 15 is a view for explaining a modification of the second embodiment.
Figure 16:
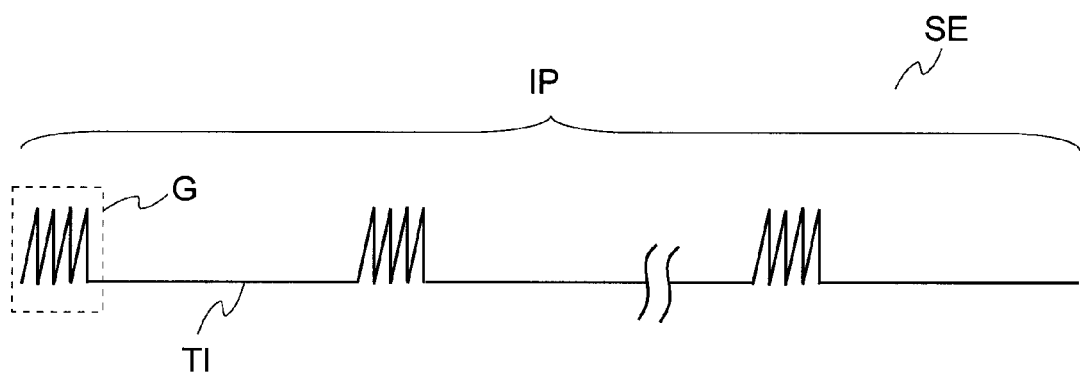
FIG. 16 is a view illustrating one of a plurality of intermittent waveform patterns shown in FIG. 15.

Each intermittent waveform pattern IP has been described as having a plurality of chirp waves (having the same waveform) arranged at intervals of the idle running time TI. However, as shown in FIG. 15 and FIG. 16, each intermittent waveform pattern IP may have a configuration in which waveform groups G each have a plurality of chirp waves and are arranged at intervals of the idle running time TI. Such a waveform pattern can be implemented by configuring the signal generating unit 11 such that the signal generating unit generates first transmission signals and second transmission signals each of which includes a plurality of chirp signals. FIG. 15 is a view for explaining a modification of the second embodiment. FIG. 16 is a view illustrating one of a plurality of intermittent waveform patterns IP shown in FIG. 15.

In the present modification, each waveform group G has a plurality of chirp waves continuously arranged. In the present modification, the number of chirp waves which are included in each waveform group G is four. However, the number of chirp waves in each waveform group can be changed. Also, in some cases, the plurality of chirp waves in each waveform group may be arranged at intervals of a short time, not continuously. Further, the pattern of the plurality of waveform groups G in each waveform set is the same for the waveform sets SE. Also, as shown in FIG. 15, the transmission wave TW is transmitted to N-number of directions, i.e. at the transmission angle A1 to the transmission angle AN. All of the intermittent waveform patterns IP which are transmitted at the plurality of transmission angles A1 to AN are identical. However, the intermittent waveform patterns IP for the transmission angles A1 to AN may be different from one another. In this case, it is possible to set a detectable velocity range Vmax and a velocity resolution Vmin for each angle.

In the present modification, first, transmission of the intermittent waveform pattern IP for the transmission angle A1 is started. At this time, between transmission of the first waveform group G of the intermittent waveform pattern IP and transmission of the second waveform group, an interval of the idle running time TI occurs. In this interval of the idle running time TI, the first waveform groups G of the intermittent waveform patterns IP for the transmission angle A2 to the transmission angle AN are sequentially transmitted. If the idle running time TI ends, the second waveform group G for the transmission angle A1 is transmitted. Subsequently, similarly to the case of the first waveform group G for the transmission angle A1, in an interval of the idle running time TI1 immediately before transmission of the next waveform group the second waveform groups G of the intermittent waveform patterns IP for the transmission angle A2 to the transmission angle AN are sequentially transmitted. Thereafter, by the same processing, the third and subsequent waveform groups G for the transmission angles A1 to AN are sequentially transmitted. If all waveform groups G of the intermittent waveform patterns IP for the transmission angles A1 to AN are transmitted, one cycle of transmission of the transmission wave TW for acquiring target information finishes. After one cycle ends, if an appropriate time elapses, the next cycle is started.

After one cycle ends, the deriving unit 32 extracts, for example, reception signals obtained by transmitting the first chirp waves of the waveform groups G of the intermittent waveform patterns IP for the transmission angles A1 to AN, and performs an FFT process on the set of extracted reception signals. The FFT process includes a distance direction FFT process and a velocity direction FFT process. On the basis of a two-dimensional power spectrum obtained by the FFT process, the deriving unit 32 calculates the distances and relative velocities of targets. In other words, in the present modification, the deriving unit extracts a set of a plurality of chirp waves to be transmitted at intervals of a predetermined time (an idle running time) apparently, from the intermittent waveform patterns IP, and performs the FFT process on a set of reception signals based on the extracted set, thereby calculating the distances and relative velocities of targets. In the present modification, the deriving unit extracts reception signals obtained by transmitting the first chirp waves of the waveform groups G However, the deriving unit may extract reception signals obtained by transmitting chirp waves corresponding to any other ordinal number, such as the second chirp waves of the waveform groups.

Whenever a waveform group G is transmitted, the deriving unit 32 may perform the FFT process on a set of reception signals obtained by the transmission of the waveform group, thereby calculating temporary distances and temporary relative velocities. The FFT process includes a distance direction FFT process and a velocity direction FFT process. In the present modification, since each waveform group G includes four chirp waves, the deriving unit 32 performs the FFT process on a set of four reception signals based on four chirp waves, thereby calculating temporary distances and temporary relative velocities.

The configurations of the embodiments and the modifications shown in this specification are merely examples of the present invention. The configurations of the embodiments and the modifications can be appropriately modified without departing the technical idea of the present invention. Also, some of the embodiments and the modifications may be combined as far as feasible.

In the embodiments described above, as the system for detecting the distances and relative velocities of targets, the FCM system is used. However, the present embodiment can also be applied to radar devices using other methods of detecting Doppler shifts as the phase differences between a plurality of chirp or pulse signals, not as the frequencies of beat signals, such as a phase Doppler system. Also, the signal generating unit of the present embodiment generates first transmission signals, second transmission signals, third transmission signals, and fourth transmission signals, which include modulated signals. Theses modulated signals may be, for example, chirp signals or pulse signals.

What is claimed is:
1. A radar device comprising:
a signal generator configured to generate a transmission signal;
a transmitter configured to output a transmission wave based on the transmission signal, at each of predetermined angles in a horizontal direction;
a receiver configured to receive reflected waves of the transmission wave from targets; and
at least one processor configured to derive information on the targets based on reception signals related to the reflected waves, wherein
the signal generator generates a first transmission signal including at least one modulated signal as the transmission signal related to the transmission wave to be output at a first angle in the horizontal direction, a plurality of times, at predetermined time intervals, and generates a second transmission signal including at least one modulated signal, as the transmission signal related to the transmission wave to be output at each of second angles in the horizontal direction different from the first angle, during each of the predetermined time intervals, and the transmitter includes a plurality of antenna elements that point in different directions, a first one of the plurality of antenna elements outputting the transmission wave at the first angle based on the first transmission signal, and a second one of the plurality of antenna elements outputting the transmission wave at the second angle based on the second transmission signal.

2. The radar device according to claim 1, wherein:
the signal generator generates a third transmission signal in which a plurality of modulated signals continues, as the transmission signal related to the transmission wave to be output at the first angle, in a time period different from a time period when the signal generator generates the plurality of first transmission signals.

3. The radar device according to claim 2, wherein the at least one processor combines relative velocities derived based on the reception signals obtained by transmitting the transmission wave based on the plurality of first transmission signals and the transmission wave based on the third transmission signals, thereby determining relative velocities of the targets.

4. The radar device according to claim 1,
wherein the signal generator generates a fourth transmission signal including at least one modulated signal, as the transmission signal related to the transmission wave to be output at the first angle, a plurality of times, at time intervals different from the predetermined time intervals, and wherein the plurality of fourth transmission signals are generated in a time period different from a time period when the signal generator generates the plurality of first transmission signals.

5. The radar device according to claim 4, wherein the at least one processor combines relative velocities derived based on the reception signals obtained by transmitting the transmission wave based on the plurality of first transmission signals and the transmission wave based on the plurality of fourth transmission signals, thereby determining relative velocities of the targets.

6. The radar device according to claim 1, wherein the at least one processor derives relative velocities of the targets based on the reception signals obtained by transmission of the transmission wave based on the plurality of first transmission signals.

7. The radar device according to claim 1,
wherein the second angles include all angles of the predetermined angles, except for the first angle, and
wherein the signal generator sequentially generates the second transmission signals corresponding to all individual angles except for the first angle, during each of the predetermined time intervals.

8. The radar device according to claim 1, wherein the plurality of antenna elements are stationary and point in the different directions.

9. A transmission processing method of a radar device, the method comprising:
a signal generating process of generating a transmission signal; and
an output process of outputting a transmission wave based on the transmission signal, at each of predetermined angles in a horizontal direction, the transmission wave being output by a transmitter that includes a plurality of antenna elements that point in different directions,
wherein the signal generating process includes:
a process of generating a first transmission signal including at least one modulated signal as the transmission signal related to the transmission wave to be output at a first angle in the horizontal direction, a plurality of times, at predetermined time intervals; and
a process of generating a second transmission signal including at least one modulated signal, as the transmission signal related to the transmission wave to be output at each of second angles in the horizontal direction different from the first angle, during each of the predetermined time intervals, and
wherein a first one of the plurality of antenna elements outputs the transmission wave at the first angle based on the first transmission signal, and a second one of the plurality of antenna elements outputs the transmission wave at the second angle based on the second transmission signal.

10. The method according to claim 9, wherein the plurality of antenna elements are stationary and point in the different directions.

* * * * *